United States Patent
Tanaka

(10) Patent No.: US 8,624,499 B2
(45) Date of Patent: Jan. 7, 2014

(54) POWER CONVERTER AND VEHICLE LIGHTING DEVICE, VEHICLE HEADLIGHT AND VEHICLE USING POWER CONVERTER

(75) Inventor: Toshifumi Tanaka, Kadoma (JP)

(73) Assignee: Panasonic Corporation, Osaka (JP)

( * ) Notice: Subject to any disclaimer, the term of this patent is extended or adjusted under 35 U.S.C. 154(b) by 126 days.

(21) Appl. No.: 13/377,861

(22) PCT Filed: Jul. 19, 2010

(86) PCT No.: PCT/IB2010/053269
§ 371 (c)(1),
(2), (4) Date: Dec. 13, 2011

(87) PCT Pub. No.: WO2011/010269
PCT Pub. Date: Jan. 27, 2011

(65) Prior Publication Data
US 2012/0086336 A1    Apr. 12, 2012

(30) Foreign Application Priority Data

Jul. 24, 2009   (JP) .................................. 2009-173693

(51) Int. Cl.
*B60Q 1/04* (2006.01)
*B60Q 1/02* (2006.01)

(52) U.S. Cl.
USPC ........... 315/82; 315/178; 315/185 R; 315/195

(58) Field of Classification Search
USPC ....... 315/82, 161, 162, 166, 178, 185 R, 189, 315/192, 195, 210; 362/487, 507
See application file for complete search history.

(56) References Cited

U.S. PATENT DOCUMENTS

| | | | |
|---|---|---|---|
| 2002/0109469 A1* | 8/2002 | Ito et al. ........................ | 315/291 |
| 2005/0179393 A1* | 8/2005 | Murakami et al. .............. | 315/77 |
| 2007/0069664 A1* | 3/2007 | Robinson et al. ............. | 315/312 |
| 2011/0187276 A1* | 8/2011 | Shteynberg et al. .......... | 315/186 |

FOREIGN PATENT DOCUMENTS

| | | |
|---|---|---|
| JP | 2004-50876 A | 2/2004 |
| JP | 2004-136719 A | 5/2004 |

OTHER PUBLICATIONS

International Search Report for corresponding Japanese Patent Application No. PCT/IB2010/053269 dated Dec. 14, 2010, three (3) pages in English and Japanese languages.

* cited by examiner

*Primary Examiner* — Daniel D Chang
(74) *Attorney, Agent, or Firm* — Nath, Goldberg & Meyer; Jerald L. Meyer; Stanley N. Protigal

(57) ABSTRACT

A power converter that receives a plurality of direct current (DC) powers, which are received in different modes and have a common ground and substantially the same potential, and operates a plurality of loads, wherein the power converter operates the respective loads according to input states of the plurality of DC powers and supplies the plurality of loads with power via at least a common switch element or a common coil.

11 Claims, 22 Drawing Sheets

POWER CONVERTER AND VEHICLE LIGHTING DEVICE, VEHICLE HEADLIGHT AND VEHICLE USING POWER CONVERTER

CROSS-REFERENCE TO RELATED APPLICATIONS

This application is a 35 U.S. §371 national stage filing of International Application No. PCT/IB2010/053269, filed Jul. 19, 2010, the entire contents of which are incorporated by reference herein, which claims priority to Japanese Patent Application No. 2009-173693, filed Jul. 24, 2009, the entire contents of which are incorporated by reference herein.

TECHNICAL FIELD

The present invention relates to a power converter that receives a plurality of substantially same potentials and supplies power to a plurality of loads, and a vehicle lighting device, a vehicle headlight and a vehicle using the power converter.

BACKGROUND

Existing power converters receive a single input and output a single output. However, as power sources or loads become more diverse, the need to generate a plurality of outputs in response to a plurality of inputs (which are input at various times) is becoming desirable. Particularly, in the field of a power converters mounted in vehicles, various control units have been integrated, and multi-input multi-output devices are becoming more desirable.

FIG. 18 illustrates a power converter that controls loads of two systems as an example of a vehicle lighting device having a plurality of light sources. The power converter receives a power 1 directly connected to a vehicle battery BT. A controller area network (CAN) communication 2 which is a vehicle communication controller, controls a light emitting diode (LED) 3 (reading light) and an LED 4 (foot light) of two systems. The respective inputs are received by an input connection unit 10, and an output is output to the LEDs 3 and 4 of two systems via an output connection unit 11. The power converter is configured to include first and second power converting units 8 and 9 for converting a voltage of the battery directly-connected power 1 into a certain current required by the LEDs 3 and 4, a control unit 7 for controlling the first and second power converting units 8 and 9, a control power supply unit 5 that receives the battery directly-connected power 1 and outputs the power 1 to the control unit 7, and a transceiver 6 that receives the CAN communication 2 notifying lighting timing of the LEDs 3 and 4. The control unit 7 controls the LEDs 3 and 4 by receiving detection signals corresponding to output current values from the first and second power converting units 8 and 9 and outputting driving signals to the first and second power converting units 8 and 9.

FIGS. 19 and 20 illustrate the first power converting unit 8 and the second power converting unit 9, respectively. FIG. 19 illustrates a configuration of a flyback circuit which is an example of the power converting unit. A direct current (DC) power (a voltage between +B and GND) is received by a condenser C1, and a series circuit of a primary side winding TP1 of a transformer T1 and a switch element SW1 is connected in parallel to the condenser C1. A driving signal of the switch element SW1 is input to the power converting unit. A series circuit of a secondary side winding TS1 of the transformer T1 and a diode D1 are connected in parallel to a condenser C2. An output unit is installed to connect a series circuit of a load and a resistor R1 in parallel to the condenser C2. An output current is detected by the resistor R1 and output as the detection signal.

A description will be made below in connection with a circuit operation. A current flows from the condenser C1 to the primary side winding TP1 of the transformer T1 and the switch element SW1 at ON timing of the switch element SW1. A direction of the diode D1 at the secondary side is set to a direction in which a secondary side current does not flow when the switch element SW1 is turned on, so that energy is accumulated in the transformer T1. The energy accumulated in the transformer T1 moves from the secondary side winding TS1 of the transformer T1 to the condenser C2 via the diode D1 at OFF timing of the switch element SW1. Power is supplied from the condenser C2 to the load via the resistor R1. An output current is detected by the resistor R1, and the control unit 7 adjusts an ON/OFF time of the driving signal of the switch element SW1. Thus, the output current can be constantly controlled.

FIG. 20 illustrates a configuration of a boosting circuit using an auto transformer which is an example of the power converting unit. A DC power (a voltage between +B and GND) is received by a condenser C3, and a series circuit of a primary side winding TP2 of a coil T2 and a switch element SW2 is connected in parallel to the condenser C3. A driving signal of the switch element SW2 is input to the power converting unit. A secondary side winding TS2 of the transformer T2, a diode D2, and a condenser C4 are connected in series to one another and in parallel to the switch element SW2. The primary side winding TP2 and the secondary side winding TS2 of the coil T2 are wounded to have an additive polarity, and the diode D2 is installed in a direction in which a current flows from the power to the output side. An output unit is installed to connect a series circuit of a load and a resistor R2 in parallel to the condenser C4. An output current is detected by the resistor R2, and the detected output signal is output as a detection signal.

A description will be made below in connection with a circuit operation. A current flows from the condenser C3 to the primary side winding TP2 of the coil T2 and the switch element SW2 at ON timing of the switch element SW2, and energy is accumulated in the coil T2. The energy accumulated in the coil T2 moves to the condenser C4 via the condenser C3, the coil T2, and the diode D2 at OFF timing of the switch element SW2. Power is supplied from the condenser C4 to the load via the resistor R2. An output current is detected by the resistor R2, and the control unit 7 adjusts an ON/OFF time of the driving signal of the switch element SW2. Thus, the output current can be constantly controlled.

FIG. 21 illustrates a power converter having a different configuration for controlling loads of two systems. What is different from FIG. 18 in the aspect of input and output is that DC power as an input includes Acc power 12 linked with an accessory Acc of a vehicle and IGN power source 13 linked with the ignition (IGN) of the vehicle. For this reason, the Acc power 12 and the IGN power source 13 are input to a control power supply unit 5 via diodes D4 and D3, respectively. Further, a power converting unit includes a predetermined current circuit (which has a current value obtained by dividing a voltage value, obtained by subtracting a forward voltage drop Vf of a load 3 from the IGN power source 13, by resistance of the resistor R3) configured with a resistor R3 and a switch element SW3 and a constant current circuit configured with a coil L1, a diode D5, a switch element SW4, a current detecting resistor R4, and a detecting unit 14.

FIG. 22 illustrates an operation of the constant current circuit. When the switch element SW4 is turned on, a current from the Acc power 12 flows through the coil L1, the LED 4, the current detecting resistor R4, and the switch element SW4. When the current value becomes a predetermined current Imax, the switch element SW4 is turned off. When the switch element SW4 is turned off, a current of the coil L1 flows through the LED 4, the current detecting resistor R4 and the diode D5. When the current value becomes a predetermined current value Imin, the switch element SW4 is turned on. This operation is repeated, so that constant current control is implemented.

The control unit 7 that controls a plurality of loads usually controls the switch elements SW3 and SW4 according to the CAN communication 2 or other communications and supplies power to the loads 3 and 4 (for example, the LEDs 3 and 4).

SUMMARY

The power converter that controls the plurality of loads 3 and 4 can be implemented by the configurations of the conventional example illustrated in FIGS. 18 and 21. However, the power converting unit 8 and 9 or at least the switch element is necessary for the respective loads 3, 4, and thus it is difficult to reduce the size and the cost of the lighting device. Further, a signal such as the CAN communication 2 is necessary for load control, and thus it is difficult to reduce the cost.

According to an embodiment of the present disclosure, a power converter receives a plurality of direct current (DC) powers, which are received in different modes, have a common ground, and have substantially the same potential and operates a plurality of loads. The power converter operates the loads according to input states of the plurality of DC powers and supplies the plurality of loads with power via at least a common switch element or a common coil.

DETAILED DESCRIPTION (Embodiment 1)

Figure 1:
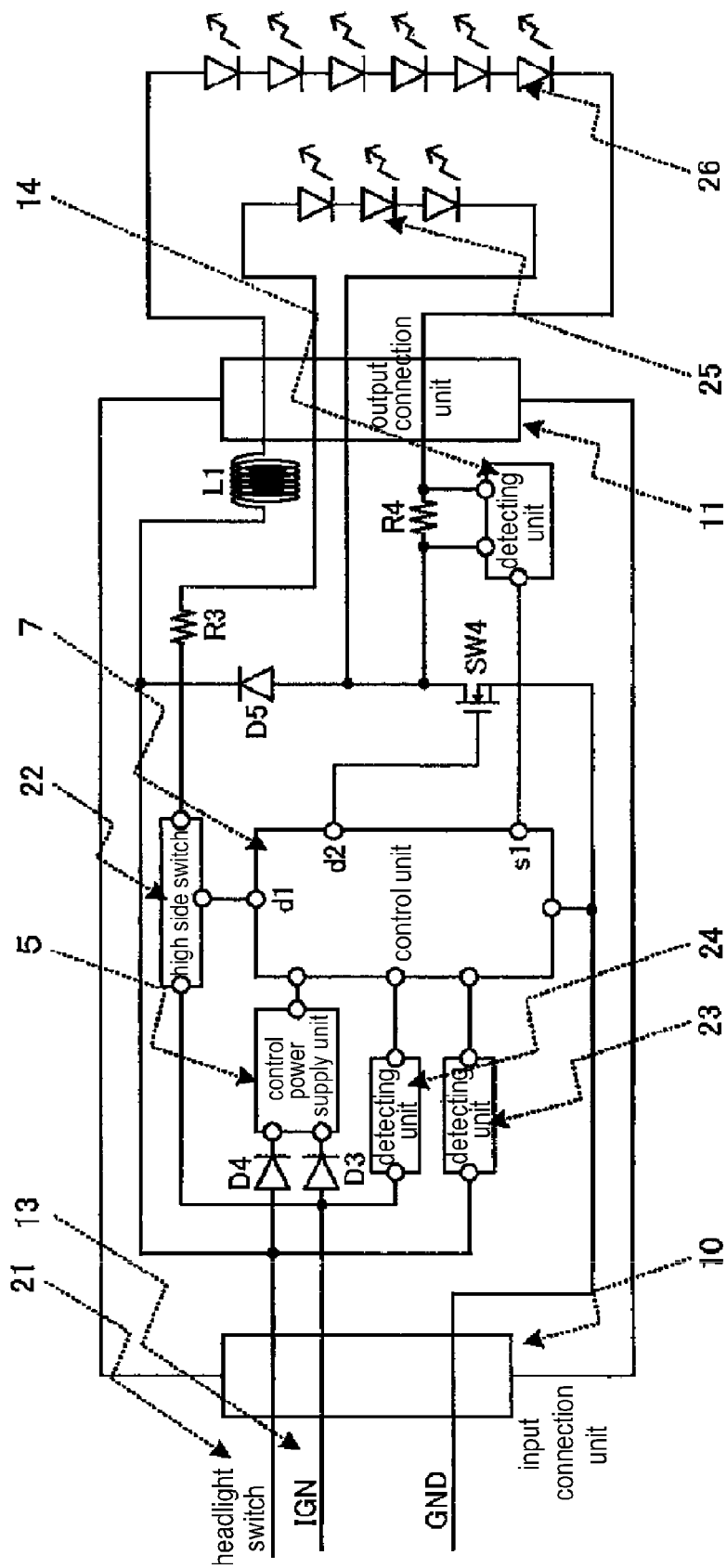
FIG. 1 is a circuit diagram according to Embodiment 1 of the present invention.

FIG. 1 illustrates a circuit configuration of a power converter according to Embodiment 1 of the present invention. Headlight 26 which generates a passing beam is a load of power source 21 which is linked with a headlight switch. Power is supplied from the power source 21, which is linked with the headlight switch, to the headlight 26 (e.g., LED) through a coil L1, a current detecting resistor R4, and a switch element SW4. A diode D5 is connected in a direction in which a current by the coil L1 is regenerated when the switch element SW4 is turned off. A current flowing through the headlight 26 is detected by the current detecting resistor R4 and a detecting unit 14, and a detection signal s1 is input to the control unit 7.

A day time running light (DTRL) provides a load across power source 13 which is linked with an ignition (IGN). The day time running light (DTRL) 25 is turned on during the daytime to inform another vehicle of its presence. Power is supplied from the power source 13 linked with the ignition (IGN) to the DTRL 25 through a high side switch 22, a resistor R3, and the switch element SW4. Detecting units 23 and 24 detect a state of the power source 13 linked with the ignition (IGN) and a state of the power source 21 linked with the headlight switch. The detection results are input to the control unit 7. The control unit 7 detects the state of the power source 21 linked with the headlight switch and the state of the power source 13 linked with the ignition (IGN) and controls the turning ON/OFF of both loads as shown in Table 1.

TABLE 1

| | | | | |
|---|---|---|---|---|
| IGN power source 13 | OFF | ON | OFF | ON |
| Headlight SW power source 21 | OFF | OFF | ON | ON |
| Load 25 | OFF | ON | OFF | OFF |
| Load 26 | OFF | OFF | ON | ON |

Figure 2:
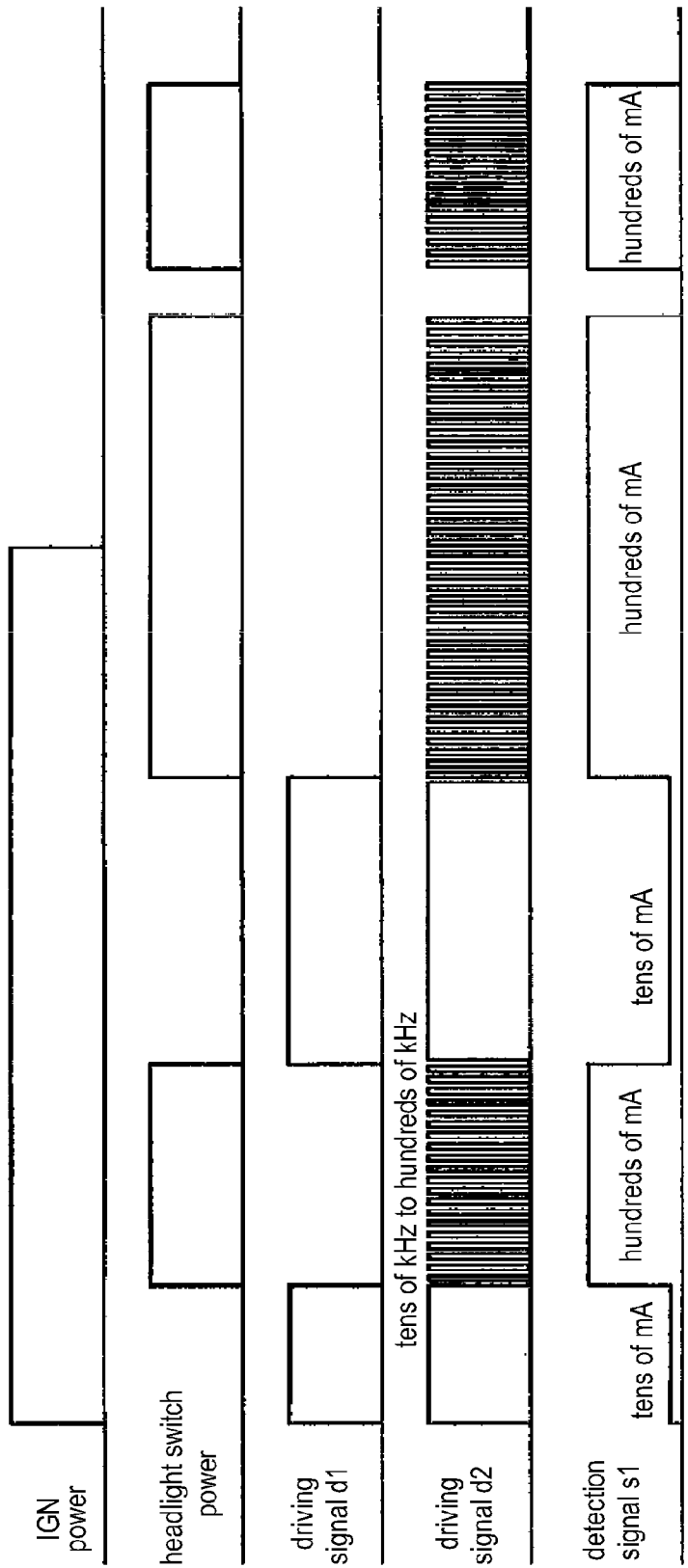
FIG. 2 is an operation waveform diagram according to Embodiment 1 of the present invention.

FIG. 2 illustrates a timing chart of lighting control of both loads by an input change of both powers. The operation is described below.

When both the IGN power source 13 and the headlight switch power source 21 are turned off, nothing is input to the control power supply unit 5, and both loads 25 and 26 are in an OFF state. When the IGN power source 13 is turned on when both loads 25 and 26 are in the OFF state, the high side switch 22 and the switch element SW4 are turned on by driving signals d1 and d2, and the LED 25 is turned on through the resistor R3. In this case, the resistor R3 is supposed to output a predetermined current limited to several milliamperes (mA) to tens of milliamperes (mA) and thus has a resistance in the tens of ohms (Ω) to thousands of ohms (Ω) (for example, 680 Ω).

Thereafter, when the headlight switch power source 21 is turned on, the driving signal d1 of the high side switch 22 is turned off, so that the power supply to the LED 25 is cut off. Further, a constant current is supplied to the LED 26 by turning on/off the switch element SW4 through the driving signal d2 (for example, by driving at tens of kHz to hundreds of kHz). When the switch element SW4 is turned on, a current is supplied from the power source 21 linked with the headlight switch to the LED 26 while flowing through the coil L1, the LED 26, the resistor R4, and the switch element SW4. When the switch element SW4 is turned off, a regeneration current flows through the coil L1, the LED 26, the resistor R4, and the diode D5. A change in the current is detected by the resistor R4, and turning on/off of the switch element SW4 is controlled according to the detection signal s1, so that the constant current is implemented. In this case, the resistor R4 is used for current detection and has a resistance in the tens of milliohm (mΩ) to several ohm (Ω) to reduce a loss in the resistor R4 (in the case of a current of 1A, a loss is 10 mW to 1 W).

When the power source 21 linked with the headlight is turned on in the OFF state of both loads 25 and 26, the constant current is supplied to the LED 26 by turning on/off the switch element SW4 in a state in which the high side switch 22 remains turned off.

According to the present embodiment, lighting of the plurality of loads 25 and 26 can be controlled by the common switch element SW4, and on/off of the load is judged by the power state. Thus, communication including timing for turning on/off the load is unnecessary. Thus, the size and the cost can be reduced compared to the conventional circuit.

(Embodiment 1a)

When only the power source 13 linked with the IGN is turned on, the driving signal d2 is always in the ON state in Embodiment 1. However, by turning on/off lighting at a frequency (for example, 10 Hz) less than 50 Hz, blinking can be recognized by the human eye, and a glittering feeling can be improved, so that a recognition degree of a driver's vehicle during daylight hours can be improved (there is influence of the afterglow or the like, but when the LED blinks at 60 Hz or more, it looks like a dimming state of DC lighting. If a deviation of a control system or the like is considered, a glittering feeling can be implemented by performing lighting at 50 Hz or less).

Figure 3:
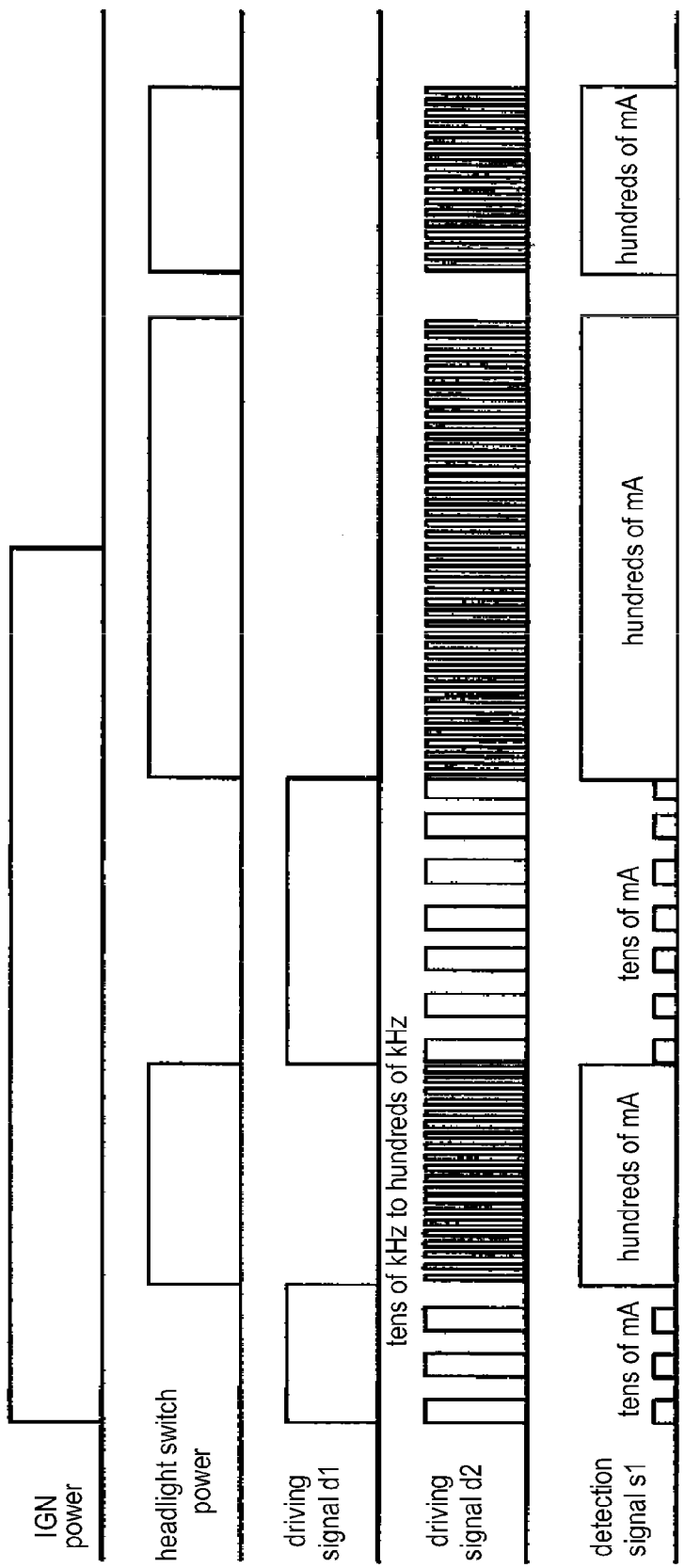
FIG. 3 is an operation waveform diagram according to a modification of Embodiment 1 of the present invention.

A timing chart at this time is illustrated in FIG. 3. Thus, it is understood that both visibility improvement by blinking control of the LED 25 and predetermined current control of the LED 26 can be implemented by the switch element SW4, and the size and the cost can be reduced compared to the case in which control is performed by the individual switch elements. It is understood that when only the IGN power source 13 is turned on, the same effect can be obtained even though the driving signal d1 and the driving signal d2 are switched.

(Embodiment 1b)

Figure 4:
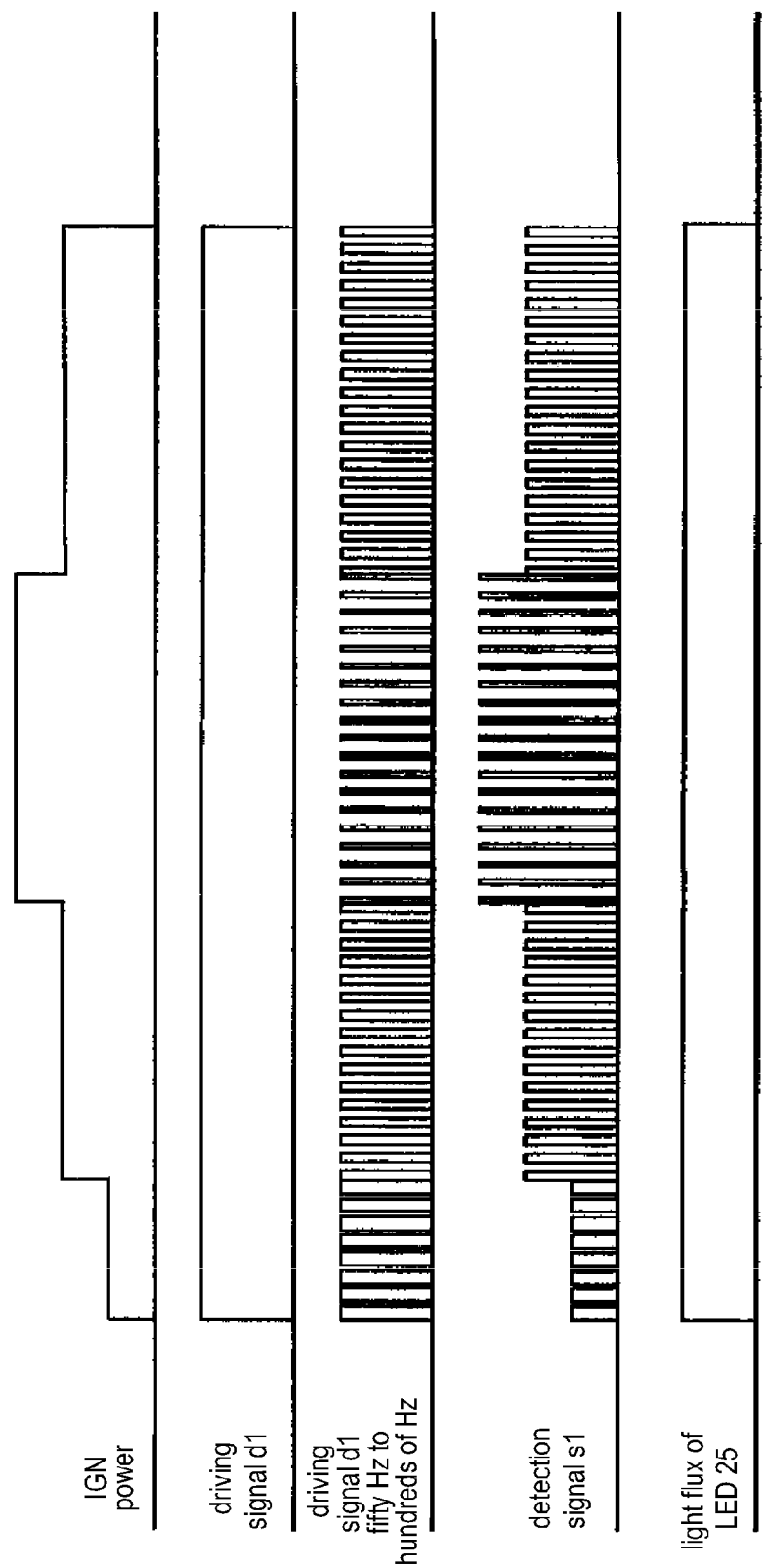
FIG. 4 is an operation waveform diagram according to another modification of Embodiment 1 of the present invention.

Further, when only the IGN power source 13 is turned on, by increasing the frequency of the driving signal d2 to 60 Hz, blinking is not seen by the human eye, so that dimming lighting can be implemented. When a predetermined current is supplied to the LED 25 via the resistor R3, the current value depends on the magnitude of the power voltage, but by varying an On duty of a pulse width modulation (PWM) according to the power voltage, it is possible to have substantially the same current during a predetermined time and make a light flux of the LED 25 substantially the same. In an example of FIG. 4, as the power voltage decreases, the On duty increases. In this disclosure, a circuit that applies a predetermined current using a resistor also includes the above described control.

(Embodiment 1c)

Figure 5:
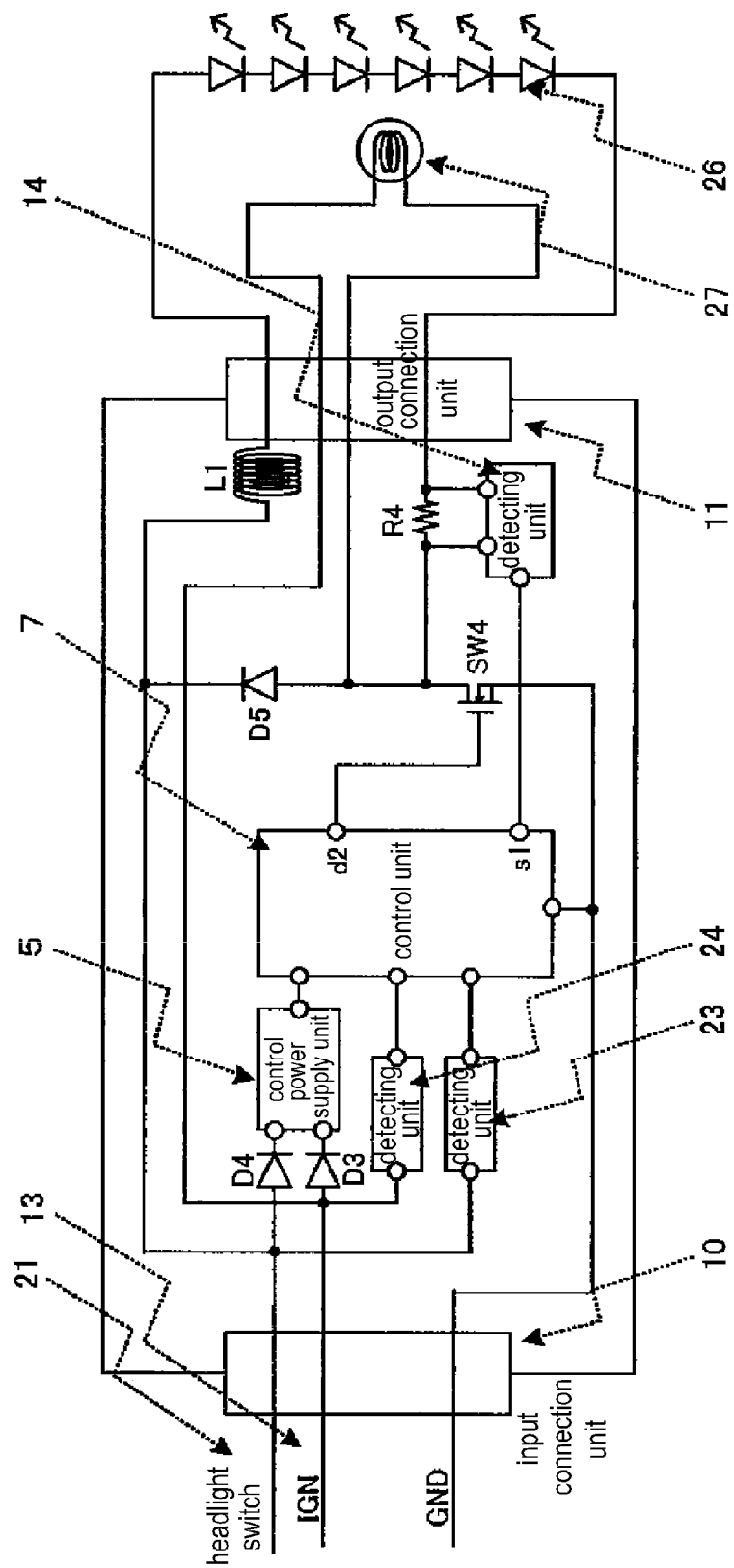
FIG. 5 is a circuit diagram according to another modification of Embodiment 1 of the present invention.

In Embodiment 1, the LED is described as the load, but it is understood that the same effect can be obtained even when a halogen lamp 27 is used as the load instead of the LED 25 as illustrated in FIG. 5. In this case, the resistor R3 may be removed.

Further, in Embodiment 1, the high side switch 22 is involved in supplying the power from the power source 13 linked with the IGN to the LED 25, but the current may be supplied without the high side switch 22 as illustrated in FIG. 5. In this case, when both the power source 21 linked with the headlight and the power source 13 linked with the IGN are turned on, the switch element SW4 is turned on/off to apply constant current to the LED 26. Thus, the halogen lamp 27 is turned on/off at a high frequency (tens of kHz or more), so that the halogen lamp 27 can be turned on in the dimming lighting state.

Further, when the halogen lamp 27 is used as a width indicator, the power source 31 linked with the IGN functions as a power source linked with a width indicator switch, and when the headlight switch is turned on, the power from the power source linked with the width indicator switch is not input. Using this system, a state in which both power sources are turned on does not occur, and the high side switch can be removed. Accordingly, the size and the cost can be reduced.

(Embodiment 2)

Figure 6:
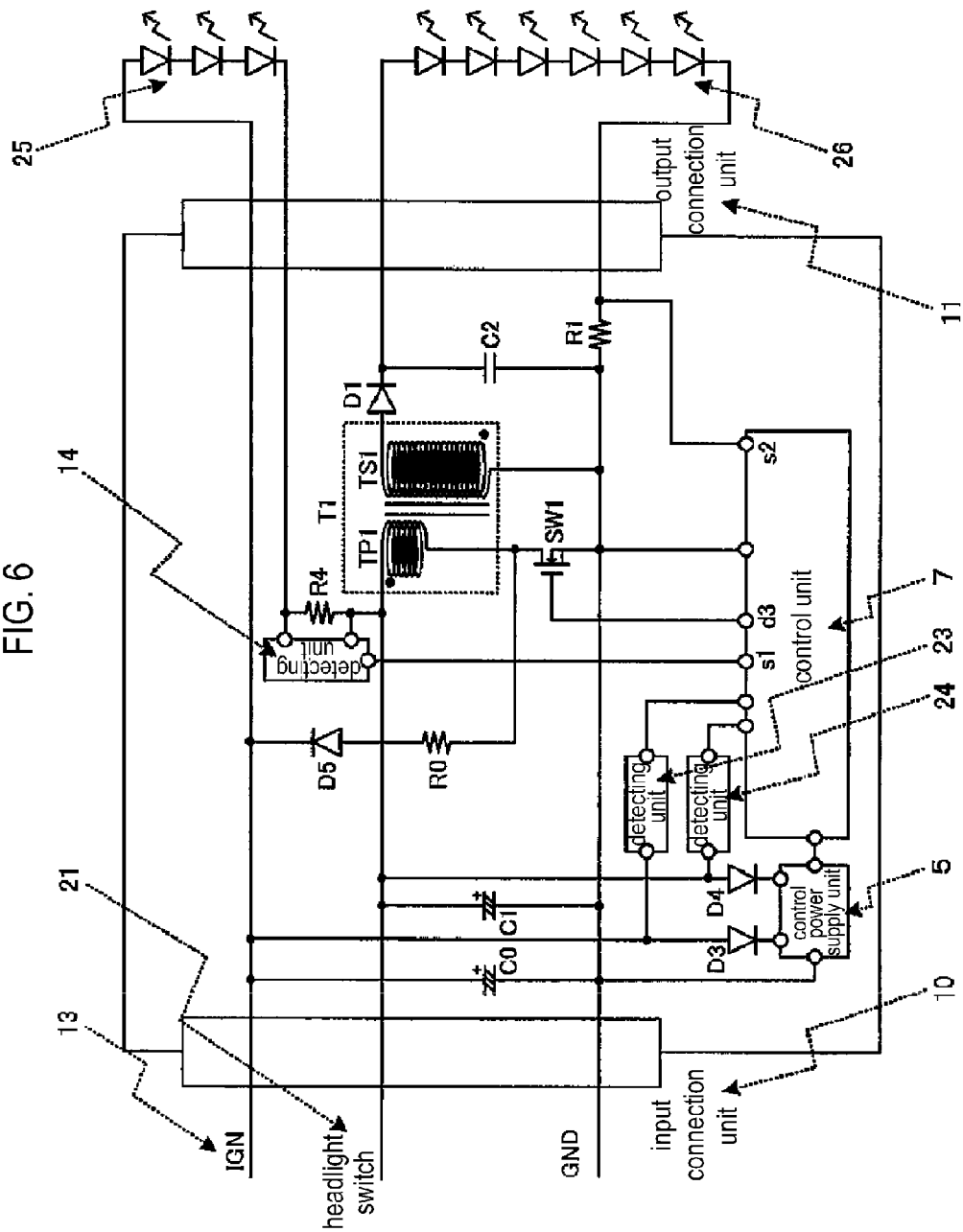
FIG. 6 is a circuit diagram according to Embodiment 2 of the present invention.

FIG. 6 illustrates a circuit configuration of a power converter according to Embodiment 2 of the present invention. The same components as in Embodiment 1 are denoted by the same reference numerals, and a description thereof will be omitted. A description will be made below in connection with different points from Embodiment 1.

Figure 19:
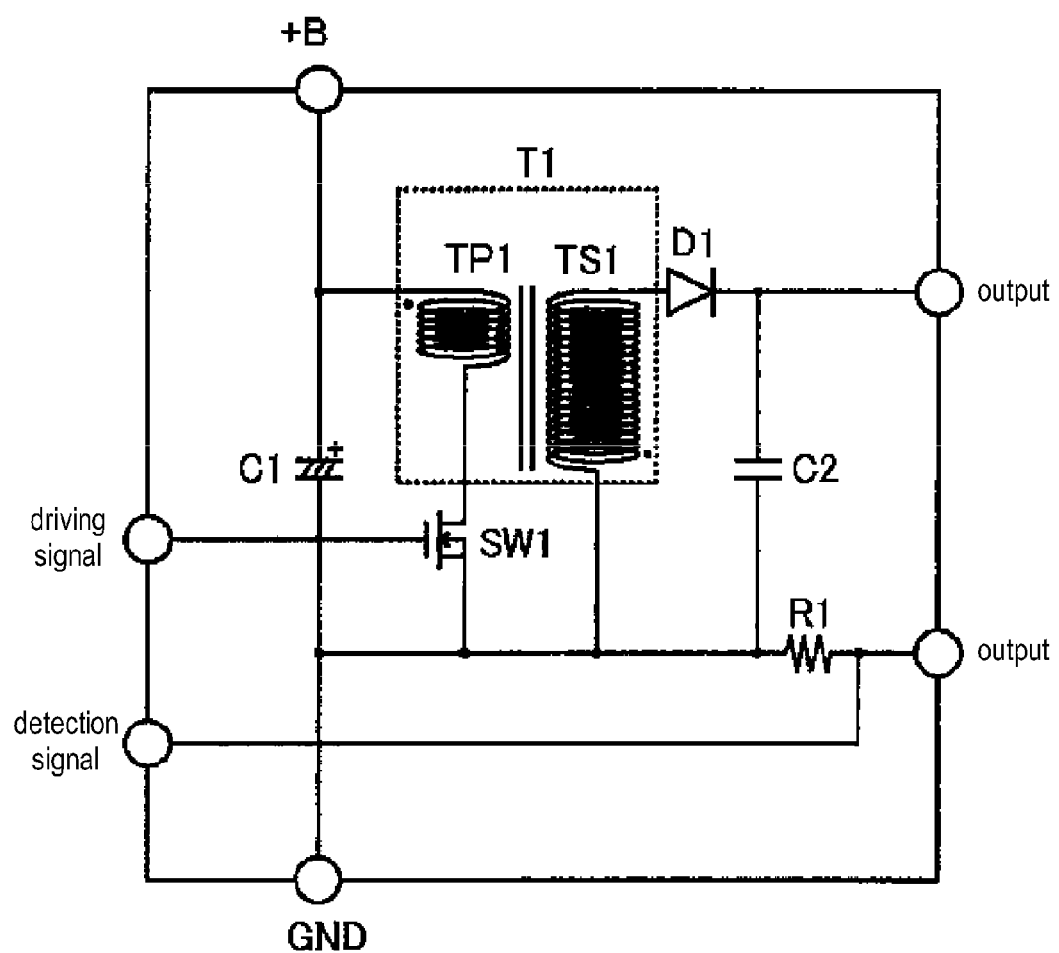
FIG. 19 is a circuit diagram illustrating an example of a power converting unit of Conventional example 1.

In the present embodiment, the flyback circuit illustrated in the conventional example of FIG. 19 is used as the power converting unit for the LED 26. The power converting unit for the LED 26 illustrated in Embodiment 1 is used as the power converting unit for the LED 25, and a resistor RO is connected in series with a diode D5. A coil and a switch element of the power converting unit that supplies power to the LED 25 are configured with a primary side winding TP1 and a switch element SW1 of a flyback circuit that supplies to power to the LED 26. A control unit 7 outputs a driving signal d3 for driving the switch element SW1. The control unit 7 detects an output current to the LED 25 and an output current to the LED 26 by a resistor R4 and a resistor R1 as a detection signal s1 and a detection signal s2, respectively.

Figure 7:
FIG. 7 is an operation waveform diagram according to Embodiment 2 of the present invention.

Operation of the control unit 7 is illustrated in FIG. 7. When a power source 13 linked with an IGN is input, the control unit 7 detects the turning on of the power source 13 through the detecting unit 23 and outputs a PWM signal for driving the switch element SW1 from the driving signal d3. Thus, the constant current is output to the LED 25. The output current is detected by the resistor R4 as the detection signal s1, and an ON time and an OFF time of the PWM signal are controlled, so that the constant current control is implemented. Further, blinking lighting of the LED 25 is performed by repetitively performing the constant current control at a certain frequency (for example, 10 Hz), a glittering feeling of the LED 25 is improved, and the recognition degree of a driver's vehicle is improved. Thereafter, when the power source 21 linked with the headlight switch is input, voltages of both terminals of the LED 25 have the same potential, so that the LED 25 is turned off. The input of the power source 21 linked with the headlight switch is detected by the detecting unit 24, and the PWM signal for driving the switch element SW1 from the driving signal d3 is output. Thus, the constant current is output to the LED 26.

The output current is detected using the resistor R1 as the detection signal s2, and the ON time and the OFF time of the PWM signal are controlled, so that the constant current control is implemented. Thereafter, the PWM signal of the driving signal d3 is switched in tandem while turning on/off of the headlight switch. When the IGN power source 13 is turned off in a state in which both the IGN power source 13 and the power source 21 linked with the headlight switch are turned on, a reverse voltage is applied to the LED 25, but the LED 25 remains turned off. When the power source 21 linked with the headlight switch is turned on in a state in which both the IGN power source 13 and the power linked with the headlight switch are turned off, the LED 26 is subjected to the constant current control by the driving signal d3.

Through the above described circuit configuration and control, it is possible to share the switch element and the coil which are relatively large-scale components in the power converting unit for controlling the outputs to the LED 25 and the LED 26. Thus, both loads can be controlled by the same switch element and coil, and thus the size and the cost of the lighting device can be reduced.

Typically, the power source 21 linked with the headlight switch is turned on in a state in which the IGN power source 13 is turned on. In this case, both an anode side and a cathode side of the LED 25 are connected to the power sources, and potentials of both sides become equal at a vehicle battery voltage (several voltages to a score of voltages), so that a voltage applied to the LED 25 becomes zero. Thus, the LED 25 can be automatically turned off without depending on the state of the switch element SW1, and the communication function or the power monitoring function can be removed, so that the size and the cost can be further reduced.

Power of the headlight is about 35 W, and power of the DTRL is about 5 W. The flyback circuit having a boosting capability is suitable for outputting power higher than a power converting circuit having no boosting capability. Thus, the LED 26 is used as the headlight, and the LED 25 is used as the DTRL.

In the present embodiment, the IGN power source 13 and the power source 21 linked with the headlight switch are used as the input. However, it is understood that even when any other power source (a power source directly connected to a battery or linked with an accessory) is added to supply power to another load, or communication such as LIN/CAN is used for load control, the same effect can be obtained. Further, it is understood that even when a power source is not added but switched (a power source linked with the IGN becomes a power directly connected to a battery or a power source linked with an accessory), the same effect can be obtained.

In the present embodiment, it is understood that the LED is used as the load, but even when a light source such as a halogen lamp or a high-intensity discharge (HID) lamp is used as the load, the same effect can be obtained. It is understood that even when the power converter is for power supply to other electronic units, not the light source, the same effect can be obtained. For example, the power converter has a function as a power source for a DC/AC converter enabling an alternating current (AC) powered device to be used within a vehicle or for an engine control unit (ECU) having a higher voltage as an input.

In an embodiment, the constant current control is performed as a control for the LED. Even when control such as constant voltage control or constant power control is performed instead of the constant current control, the same effect can be obtained.

Figure 8:
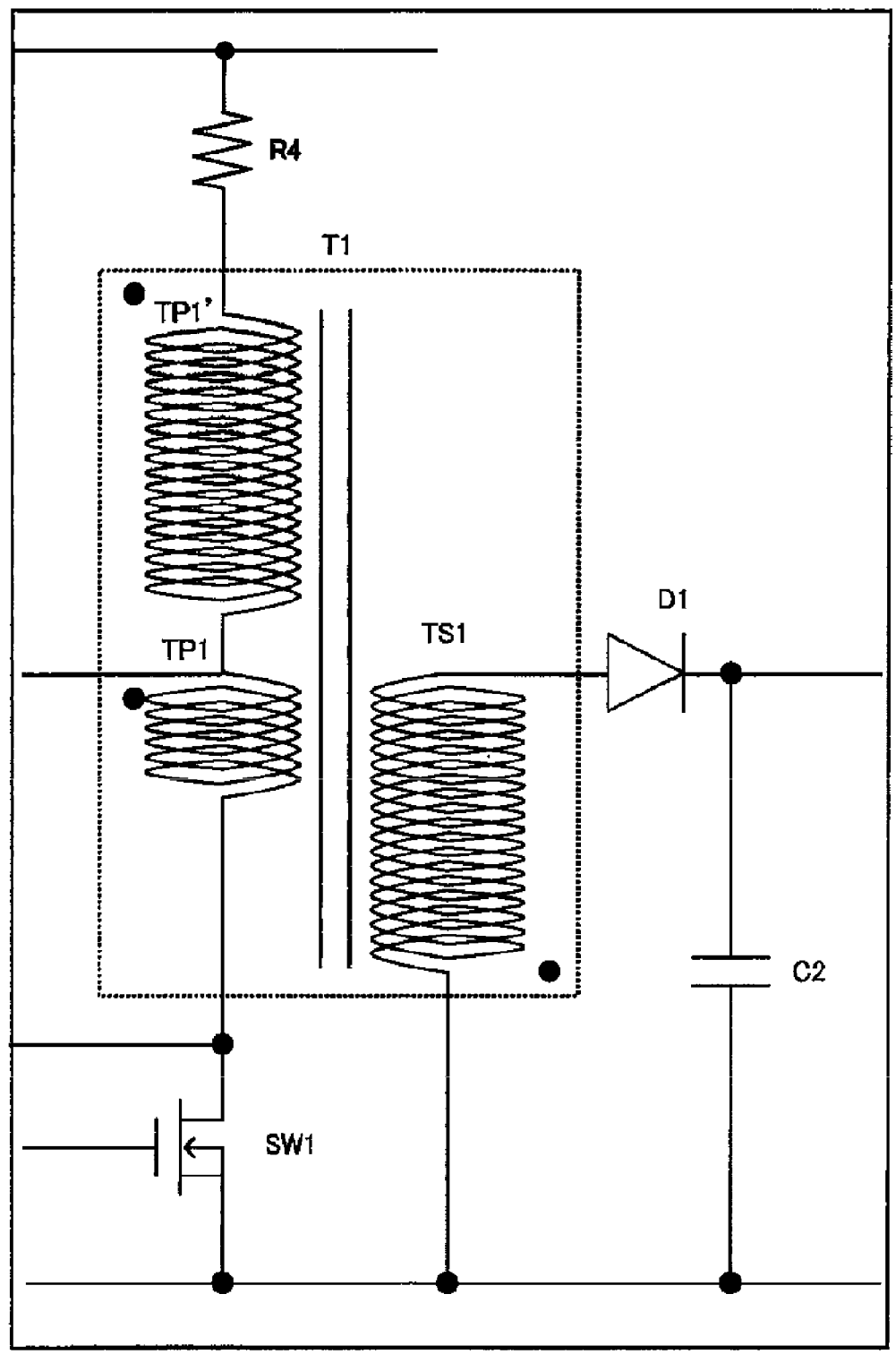
FIG. 8 is a circuit diagram illustrating a modification of a power converting unit according to Embodiment 2 of the present invention.

Further, it is understood that even when a circuit of the resistor R4, the transformer T1, the switch element SW1, the diode D1, and the condenser C2 constitute a circuit illustrated in FIG. 6, an effect which is the same as that of the circuit of FIG. 8 can be obtained. In FIG. 8, a coil TP1' is used which is further wound in the same direction as the primary side winding TP1. Thus, it is possible to easily increase an inductance value of the coil when the LED 25 is turned on and to facilitate predetermined current control.

(Embodiment 3)

Figure 9:
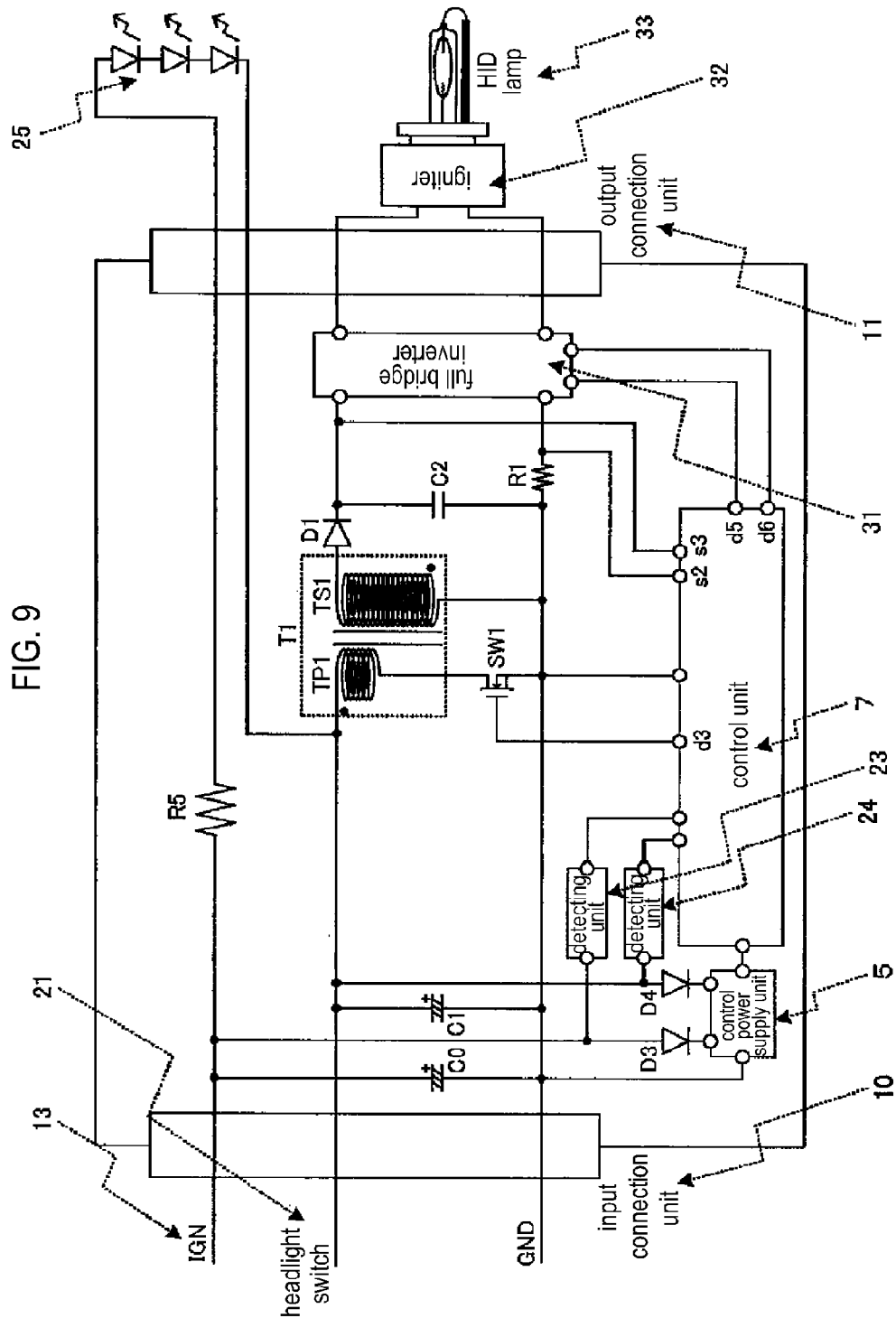
FIG. 9 is a circuit diagram according to Embodiment 3 of the present invention.

FIG. 9 illustrates a circuit diagram of Embodiment 3 of the present invention. The same components as in Embodiment 2 are denoted by the same reference numerals, and thus a description thereof will be omitted. A description is made below in connection with different points from Embodiment 2 (FIG. 6).

The LED 26 is replaced with a HID lamp 33. In order to turn on the HID lamp 33, an igniter 32 for applying a high voltage pulse is installed ahead of the HID lamp 33. In order to turn on the HID lamp 33 by a rectangular wave, a full bridge inverter 31 for converting an output of the flyback circuit into the rectangular wave is installed behind the flyback circuit. A detection signal s3 for detecting a lamp voltage is input to the control unit 7. Driving signals d5 and d6 for controlling the full bridge inverter 31 are output from the control unit 7.

A circuit for applying a predetermined current to the LED 25 includes three components, a resistor R5, a coil TP1, and a switch element SW1 which are installed in series with the LED 25. In this case, a resistance value is in a range of hundreds of ohms (Ω) to several kilohm (kΩ) since a current has a predetermined value (a voltage value of the IGN power source 13-a forward voltage drop Vf of the LED 25)/(a resistance value of the resistor R5). Since control for causing a predetermined current to flow in the resistor R5 is realized by the resistor R5, the detection signal s1 for the LED current, the detecting unit 14, and the current detecting resistor R4 are not provided, unlike other embodiments.

Figure 10:
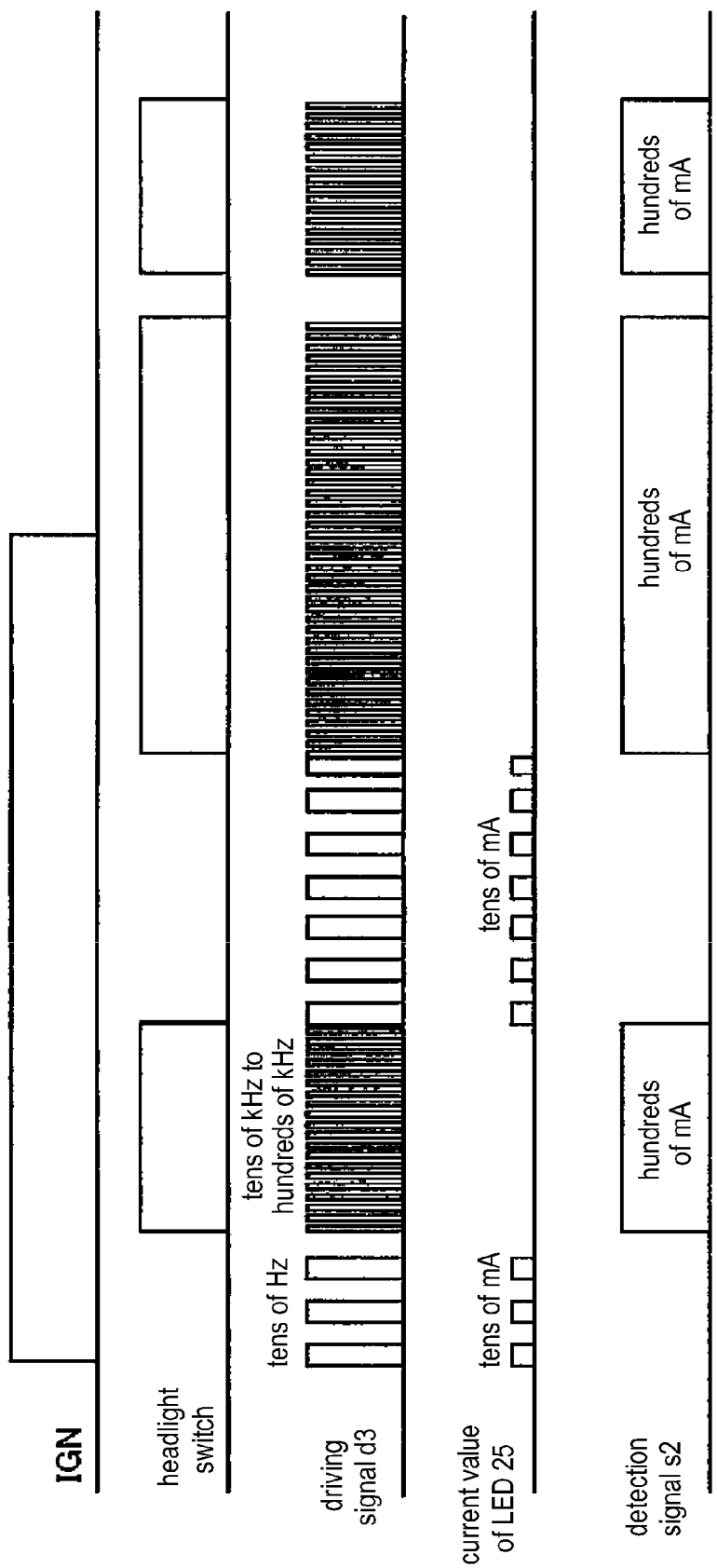
FIG. 10 is an operation waveform diagram according to Embodiment 3 of the present invention.

An operation of the control unit 7 is illustrated in FIG. 10. When the power source 13 linked with the IGN is input, the control unit 7 detects turning on of the IGN power source 13 through the detecting unit 23 and outputs the PWM signal for driving the switch element SW1 by the driving signal d3. At this time, the PWM signal is an ON/OFF signal of tens of Hz (for example, 10 Hz) so that the driver's vehicle is made more visible by highlighting the glittering feeling by blinking the LED 25. Thus, a predetermined current is supplied to the LED 25

Thereafter, when the power source 21 linked with the headlight switch is input, voltages of both terminals of the LED 25 have the same potential, and thus the LED 25 is turned off. The input of the power source 21 linked with the headlight switch is detected by the detecting unit 24, and the PWM signal for driving the switch element SW1 by the driving signal d3 is output (when the HID lamp 33 is turned on, driving is performed at tens of kHz to hundreds of kHz). By varying on/off of the PWM signal by the values of the detected lamp voltage and lamp current, constant power is supplied to the HID lamp 33. Another control such as a pulse output at the start time is necessary for turning on the HID lamp 33, but a description thereof will be here omitted.

Thereafter, the PWM signal of the driving signal d3 is switched in tandem with turning on/off of the headlight switch. When the IGN power source 13 is turned off in a state in which both the IGN power source 13 and the power source 21 linked with the headlight switch are turned on, a reverse voltage is applied to the LED 25, but the LED 25 remains off. When the headlight switch is turned on in a state in which both the IGN power source 13 and the power source 21 linked with the headlight switch are turned off, only the HID lamp 33 is controlled by the driving signal d3.

Through the above described circuit configuration and control, it is possible to share the switch element and the coil which are relatively large-scale components in the power converting unit for controlling the outputs to the LED 25 and the HID lamp 33. Thus, both loads can be controlled by the same switch element and coil, and thus the size and the cost of the lighting device can be reduced.

Typically, the headlight switch is turned on in a state in which the IGN power source is turned on. In this case, both an anode side and a cathode side of the LED 25 are connected to the power, and potentials of both sides become equal at a vehicle battery voltage (several voltages to a score of volts), so that a voltage applied to the LED 25 becomes zero. Thus, turning off can be automatically performed without depending on the state of the switch element SW1, and the communication function or the power monitoring function can be removed, so that the size and the cost can be further reduced.

Further, the circuit for turning on the LED 25 can be simplified compared to Embodiment 2, and thus the size and the cost can be further reduced.

In the present embodiment, when the LED 25 is turned on, blinking lighting is performed in order to improve the recognition degree of the driver's vehicle. However, it is understood that when only the power source 13 linked with the IGN is input, even though lighting is constantly performed or dimming lighting is performed at a higher frequency, the same effect can be obtained.

(Embodiment 4)

Figure 11:
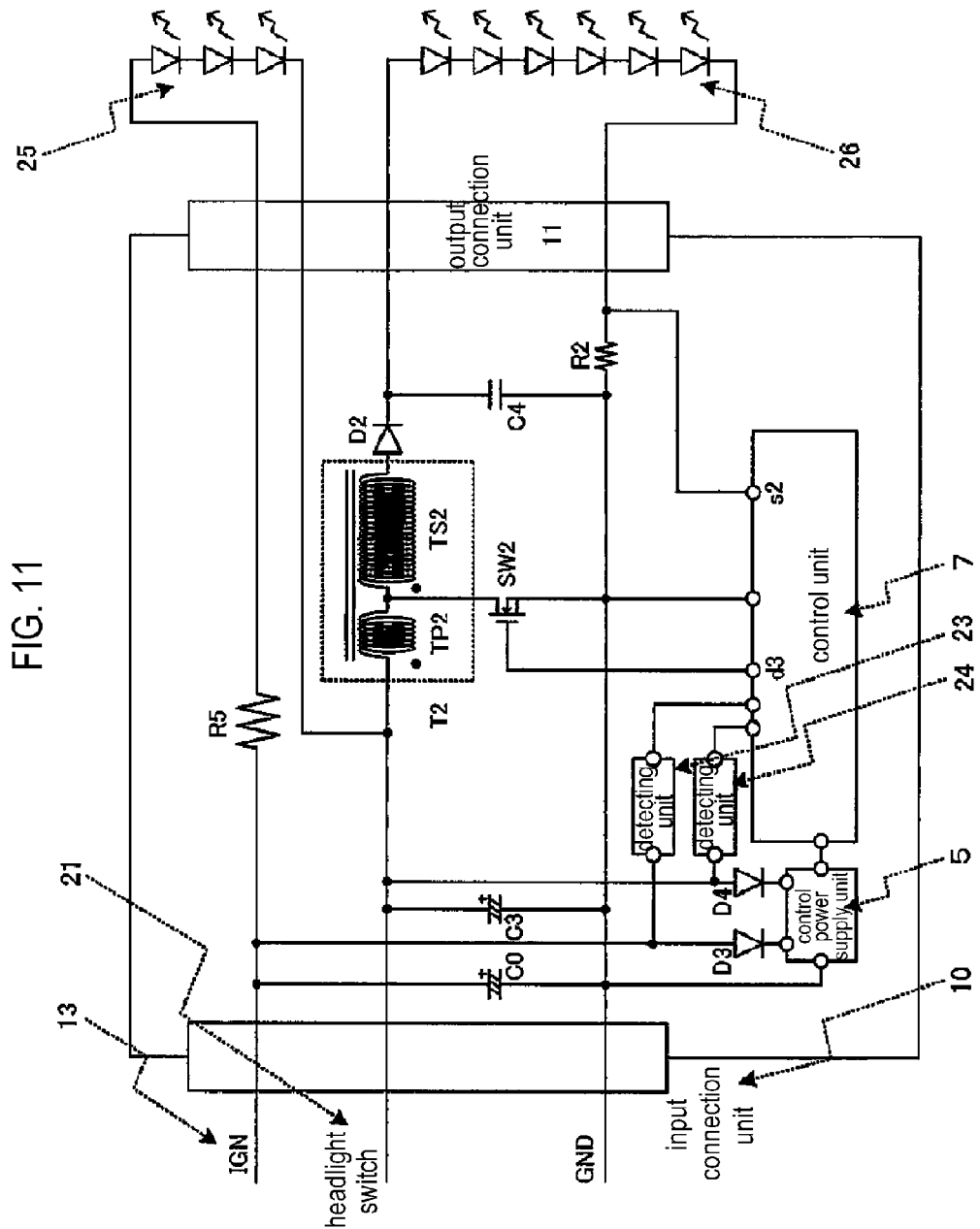
FIG. 11 is a circuit diagram according to Embodiment 4 of the present invention.

FIG. 11 illustrates a circuit diagram of Embodiment 4 of the present invention. The same components as in Embodiment 2 are denoted by the same reference numerals, and thus a description thereof will be omitted. A description will be made below in connection with different points from Embodiment 2 (FIG. 6).

Figure 20:
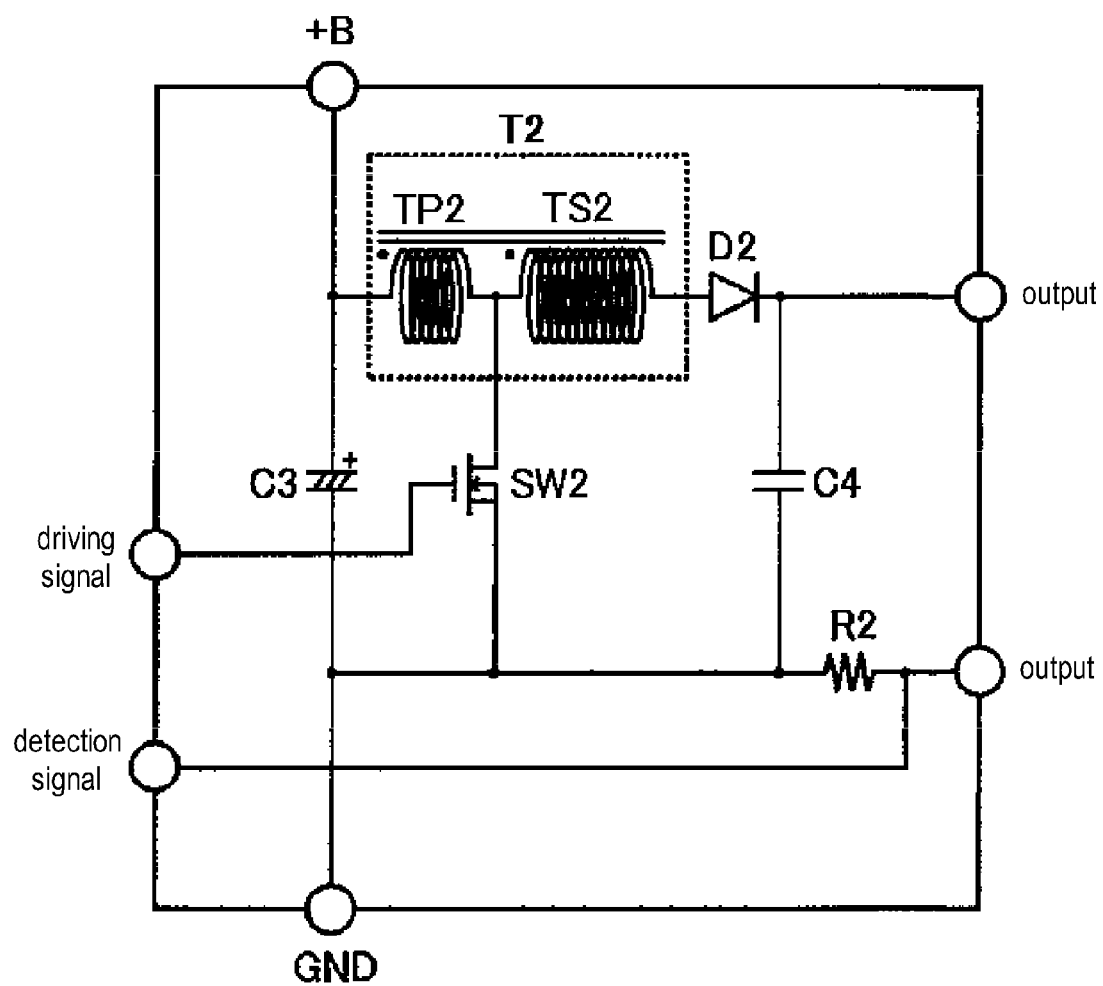
FIG. 20 is a circuit diagram illustrating another example of the power converting unit of Conventional example 1.
Figure 21:
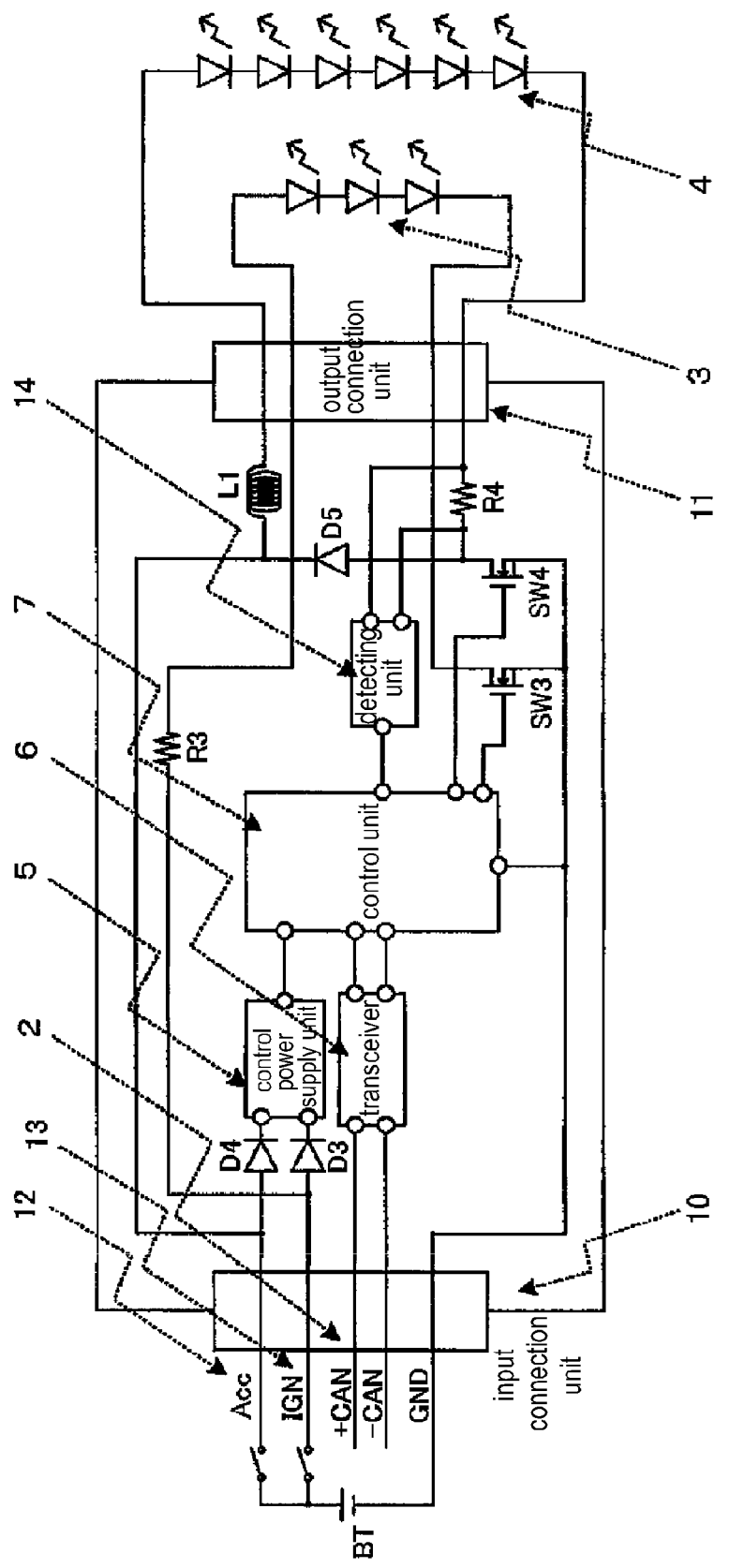
FIG. 21 is a circuit diagram of Conventional example 2.
Figure 22:
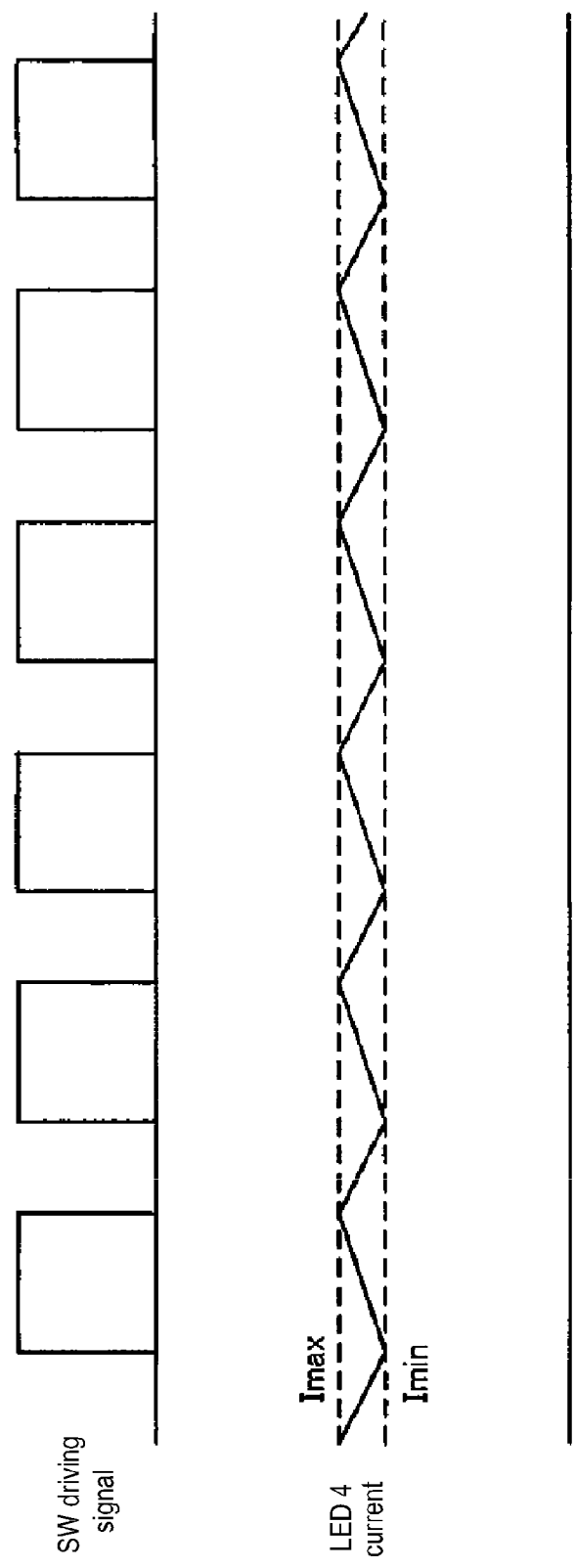
FIG. 22 is an operation waveform diagram of Conventional example 2.

In the present embodiment, the flyback circuit of Embodiment 2 (illustrated in FIG. 19) is replaced with a boosting circuit using an auto transformer illustrated in FIG. 20. A lighting circuit of the LED 25 has the circuit configuration of Embodiment 3.

Through the above configuration, it is possible to share the switch element SW2 and the coil T2 which are relatively large-scale components in the power converting unit for controlling the outputs to the LED 25 and the LED 26. Thus, both loads 25 and 26 can be controlled by the same switch element SW2 and coil T2, and thus the size and the cost of the lighting device can be reduced.

Typically, the headlight switch is turned on in a state in which the IGN power is turned on. In this case, both an anode side and a cathode side of the LED 25 are connected to the power, and potentials of both sides become equal at a vehicle battery voltage (several volts to a score of volts), so that a voltage applied to the LED 25 becomes zero. Thus, turning off can be automatically performed without depending on the state of the switch element SW2, and the communication function or the power monitoring function can be removed, so that the size and the cost can be further reduced.

Further, the circuit for turning on the LED 25 can be simplified compared to Embodiment 2, and thus the size and the cost can be further reduced.

In the present embodiment, the boosting circuit using the auto transformer is used. However, it is understood that even when any other converter circuit such as a boost chopper circuit having no secondary side winding TS2, a forward type converter, a choke circuit, or a SEPIC (single-ended primary inductance converter) circuit is used, the same effect can be obtained.

(Embodiment 5)

Figure 12:
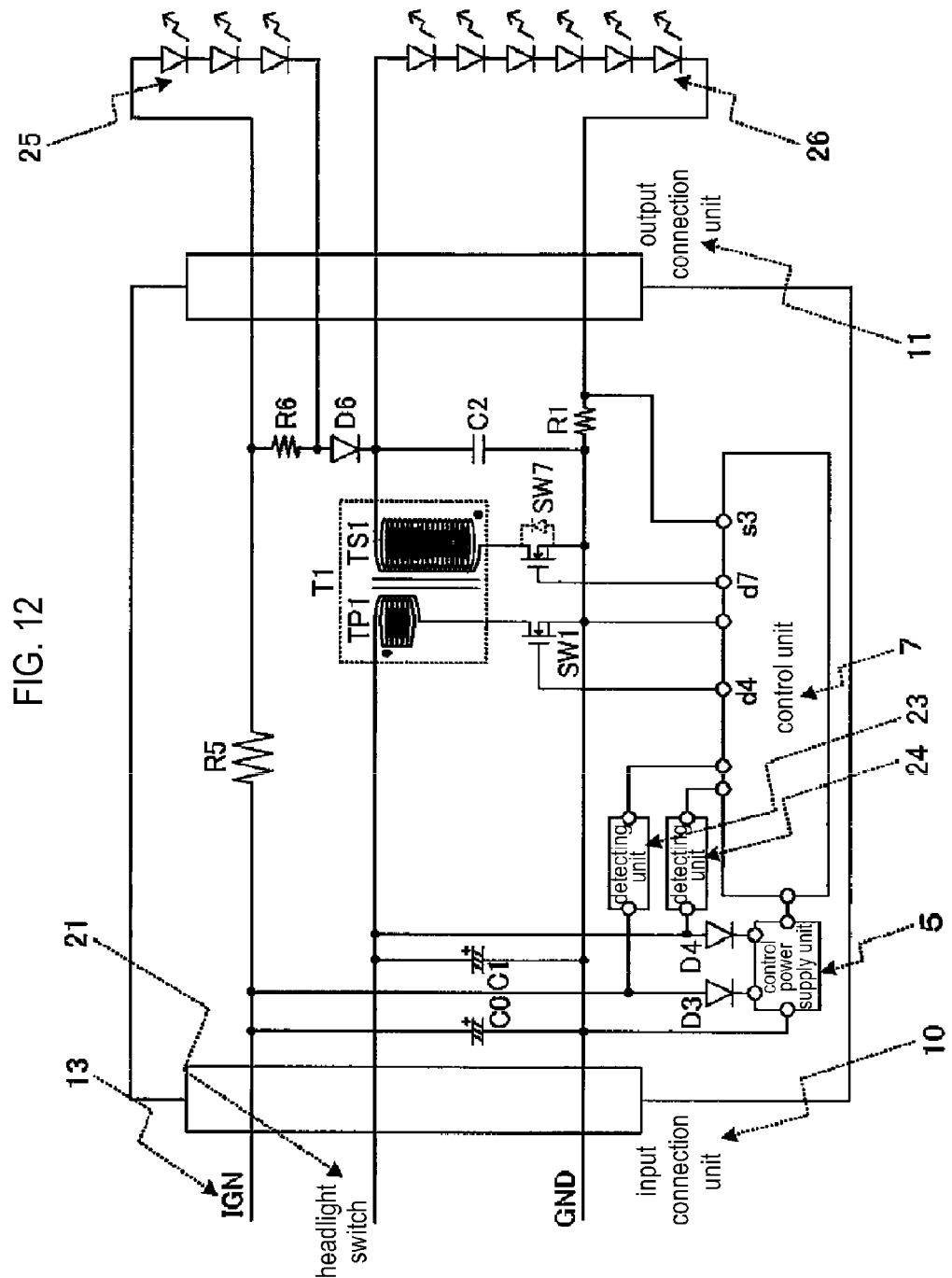
FIG. 12 is a circuit diagram according to Embodiment 5 of the present invention.

FIG. 12 illustrates a circuit diagram of Embodiment 5 of the present invention. The same components as in Embodiment 2 are denoted by the same reference numerals, and thus a description thereof will be omitted. A description will be made below in connection with different points from Embodiment 2 (FIG. 6).

In the embodiment, the diode D1 is removed from the flyback circuit that supplies power to the LED 26, and a switch element SW7 is added. A body diode of the added switch element SW7 is added to have the same effect as the removed diode D1.

A circuit for applying a predetermined current to the LED 25 includes four components, a resistor R5, a diode D6, a coil TS1, and a switch element SW7. In this case, a resistance value is in a range of hundreds of ohm ($\Omega$) to several kilohm ($k\Omega$) to limit a current.

The diode D6 is connected in series with the LED 25, and the resistor R6 is connected in parallel with the LED 25, so that a large reverse voltage is not applied to the LED 25 when the output voltage of the flyback circuit increases.

By employing this configuration, when the LED 26 is turned on, the switch element SW7 is turned off, and the flyback circuit is configured using the body diode of the switch element SW7. Thus, the LED 26 is turned on by the constant current. When the LED 25 is turned on, the switch element SW7 is turned on, and a predetermined current is applied to the LED 25 via the resistor R5. Further, blinking of the LED 25 is performed (at the frequency of 10 Hz) by applying or not applying the predetermined current by the coil TS 1 and the switch element SW7.

Further, when the LED 26 is turned on by the flyback circuit, the switch element SW7 is not constantly turned off, but when the switch element SW1 is turned off, the switch element SW7 is turned on, so that synchronization rectification of the flyback circuit can be performed. As a result, efficiency can be further improved compared to the case in which only the body diode is used.

Through the above configuration, it is possible to share the switch element and the coil which are relatively large-scale components in the power converting unit for controlling the outputs to the LED 25 and the LED 26. Thus, both loads can be controlled by the same switch element and coil, and thus the size and the cost of the lighting device can be reduced.

Figure 13:
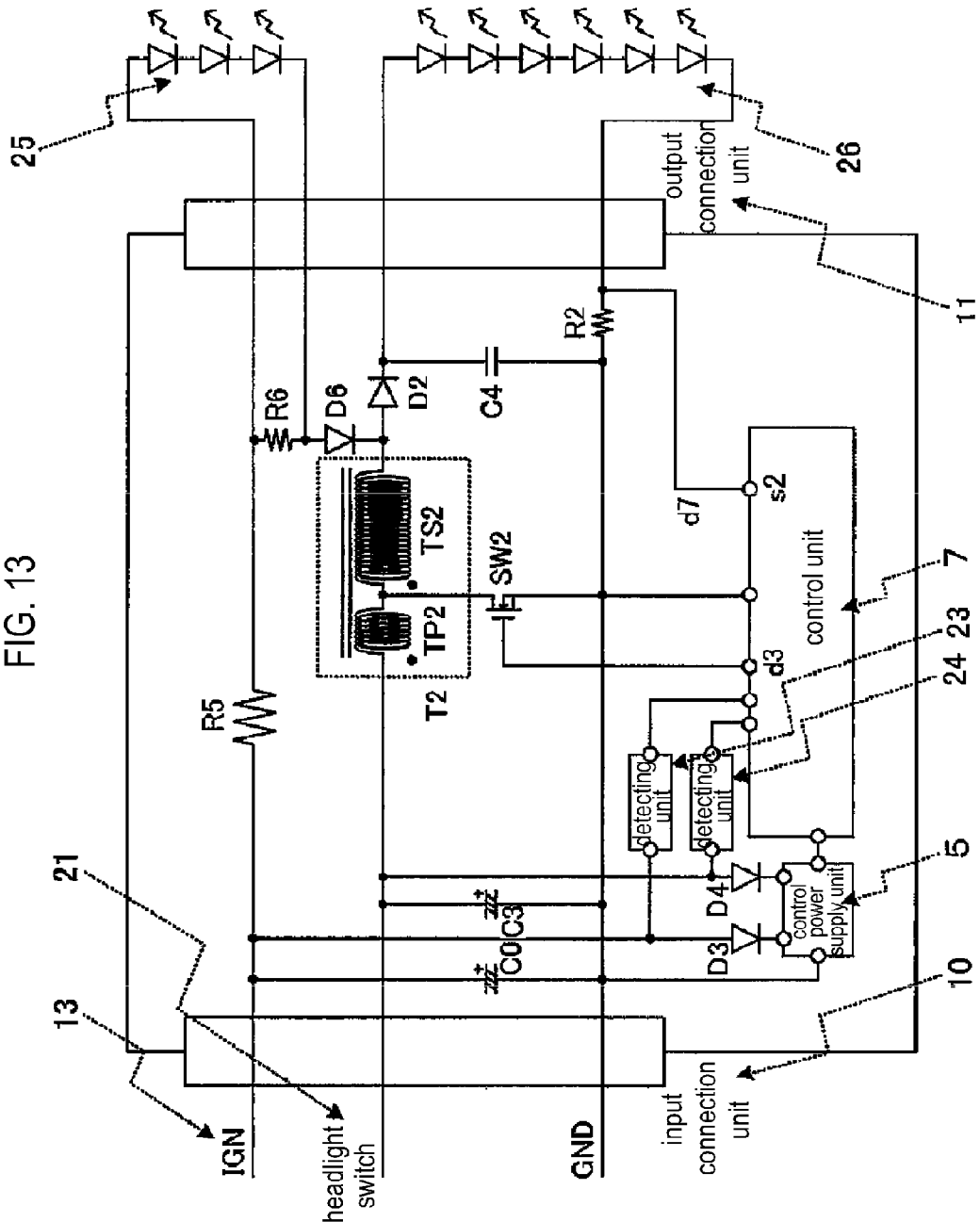
FIG. 13 is a circuit diagram according to a modification of Embodiment 5 of the present invention.

In the present embodiment, the flyback circuit is used, but it is understood that even when any other converter circuit such as an auto transformer circuit (FIG. 13) is used, the same effect can be obtained.

(Embodiment 6)

Figure 14:
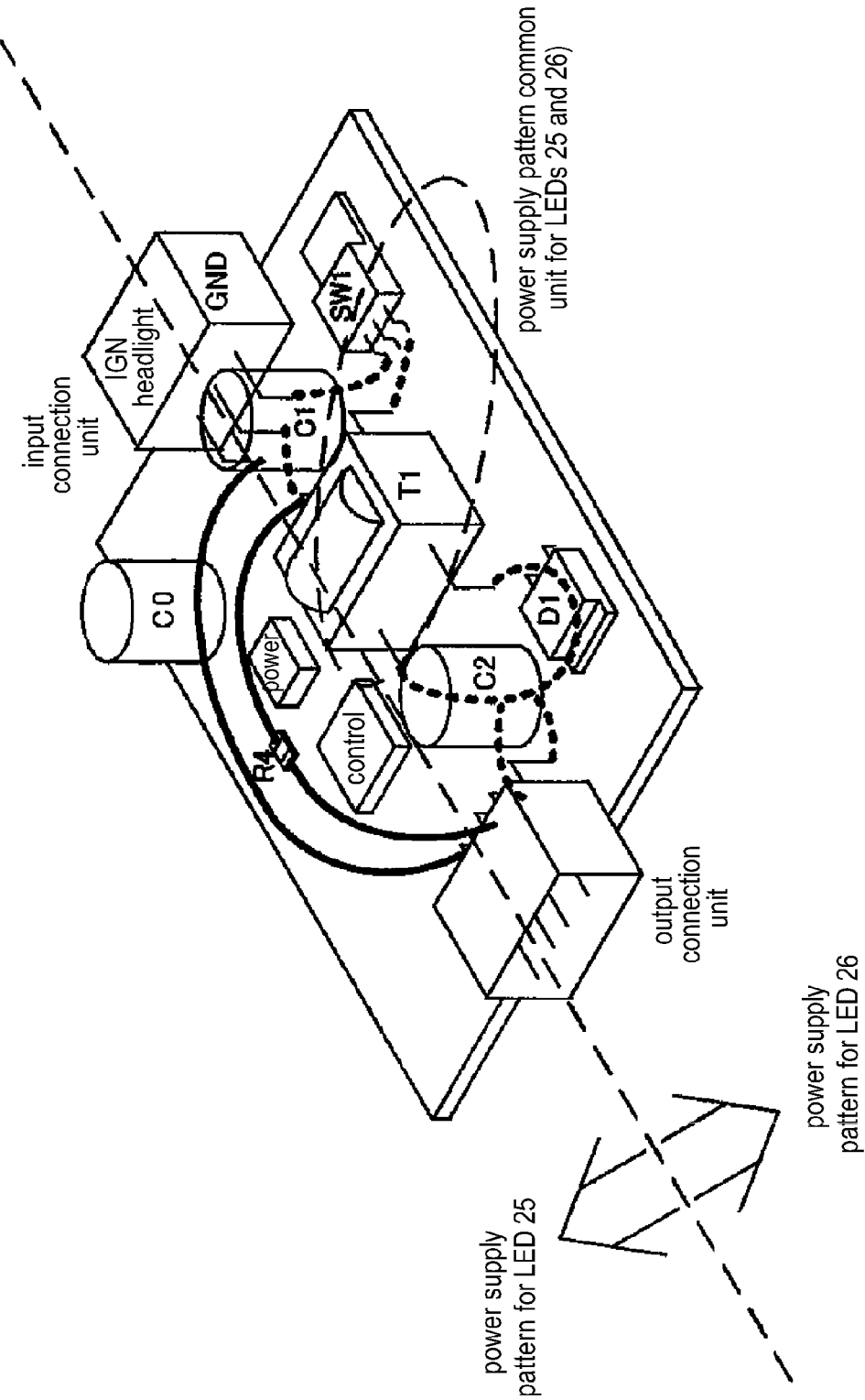
FIG. 14 is a perspective diagram illustrating a circuit substrate in which an LED lighting device according to Embodiment 2 of the present invention is mounted.

FIG. 14 illustrates a circuit substrate in which an LED lighting device as illustrated in Embodiment 2 of the present invention is used. Power is received from an input connection unit 10, and power is output to an output connection unit 11. In the present embodiment, since power supply units for two loads are present, a power supply to the LED 25 is separated from a power supply to the LED 26, and the control unit 7 is installed therebetween, so that noises of the power supply units are reduced.

By using the circuit configuration illustrated in FIG. 6, the size and the cost of the substrate can be reduced.

Figure 15:
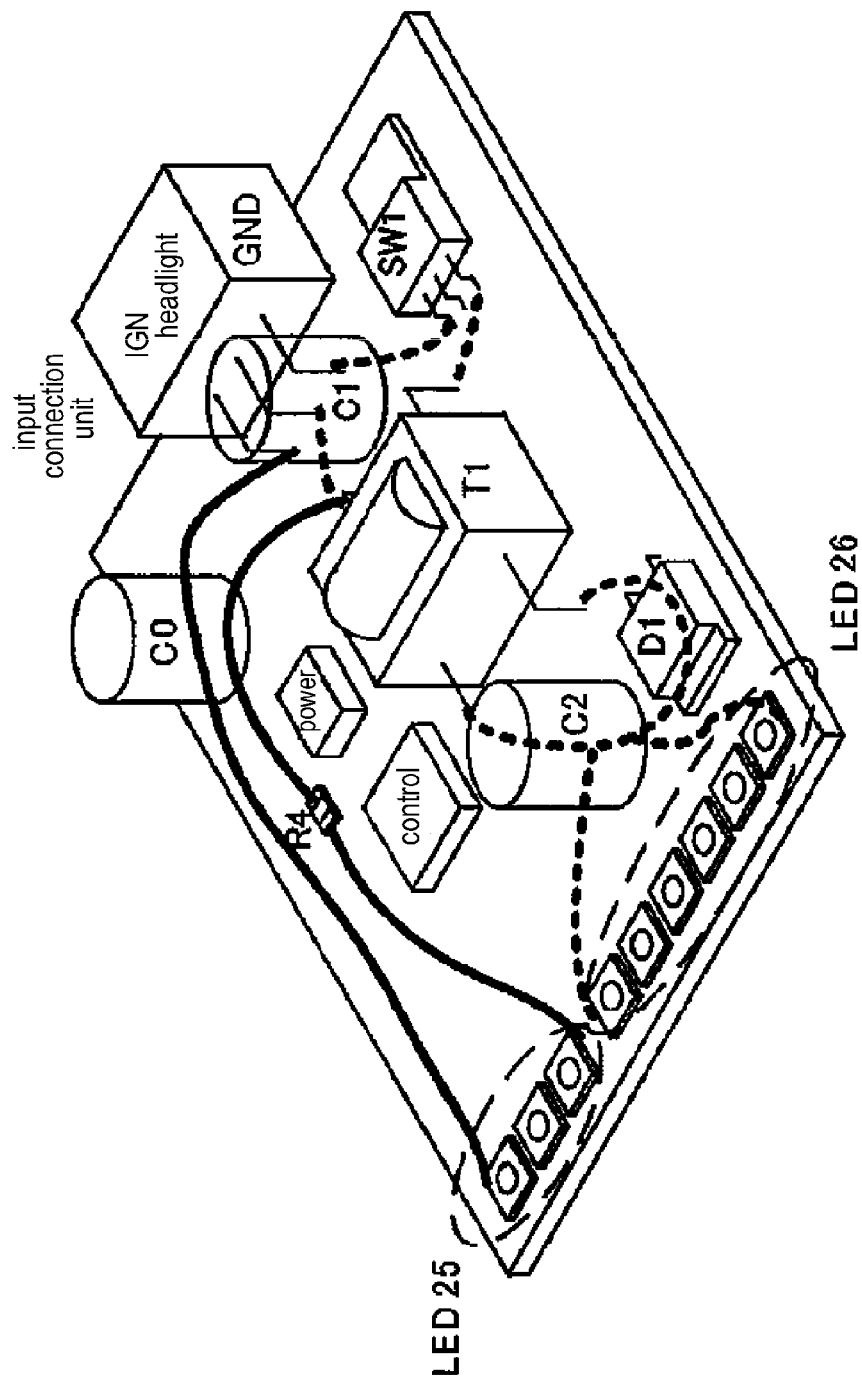
FIG. 15 is a perspective diagram illustrating a circuit substrate in which LEDs which are loads are simultaneously mounted on a substrate on which an LED lighting device according to Embodiment 2 of the present invention is mounted.

FIG. 15 illustrates a circuit substrate in which the LEDs 25 and 26 which are the loads are simultaneously mounted on the substrate on which the power supply unit is mounted. In this circuit substrate, an output connection unit is configured with a pattern, and the LEDs 25 and 26 can be mounted on the same substrate as the loads. Thus, the size and the cost can be further reduced.

(Embodiment 7)

Figure 16:
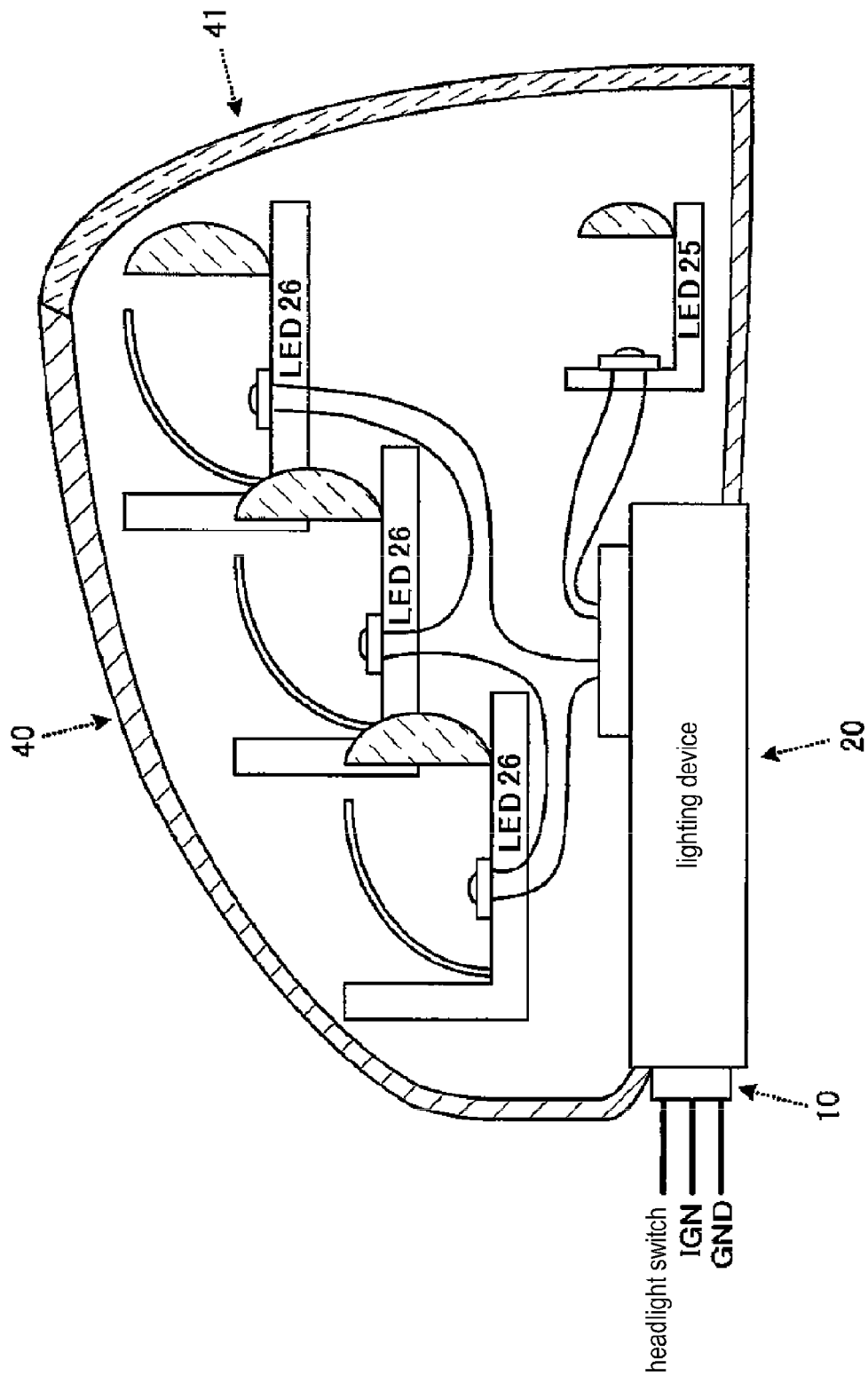
FIG. 16 is a schematic cross-sectional diagram of a vehicle headlight having a lighting device of the present invention.

FIG. 16 illustrates a schematic cross-sectional structure of a vehicle headlight having a lighting device of the present invention. A front opening of a case 40 in which the LEDs 25 and 26 are mounted as the loads is covered with a transparent cover 41, and a lighting device 20 of the present invention is mounted on the bottom of the case 40. By mounting the lighting device 20 of the present invention, the size and the cost of the vehicle headlight can be reduced.

Further, since the single lighting device 20 can have a plurality of functions, an input connector (the input connection unit 10) for the vehicle headlight can be put together.

(Embodiment 8)

Figure 17:
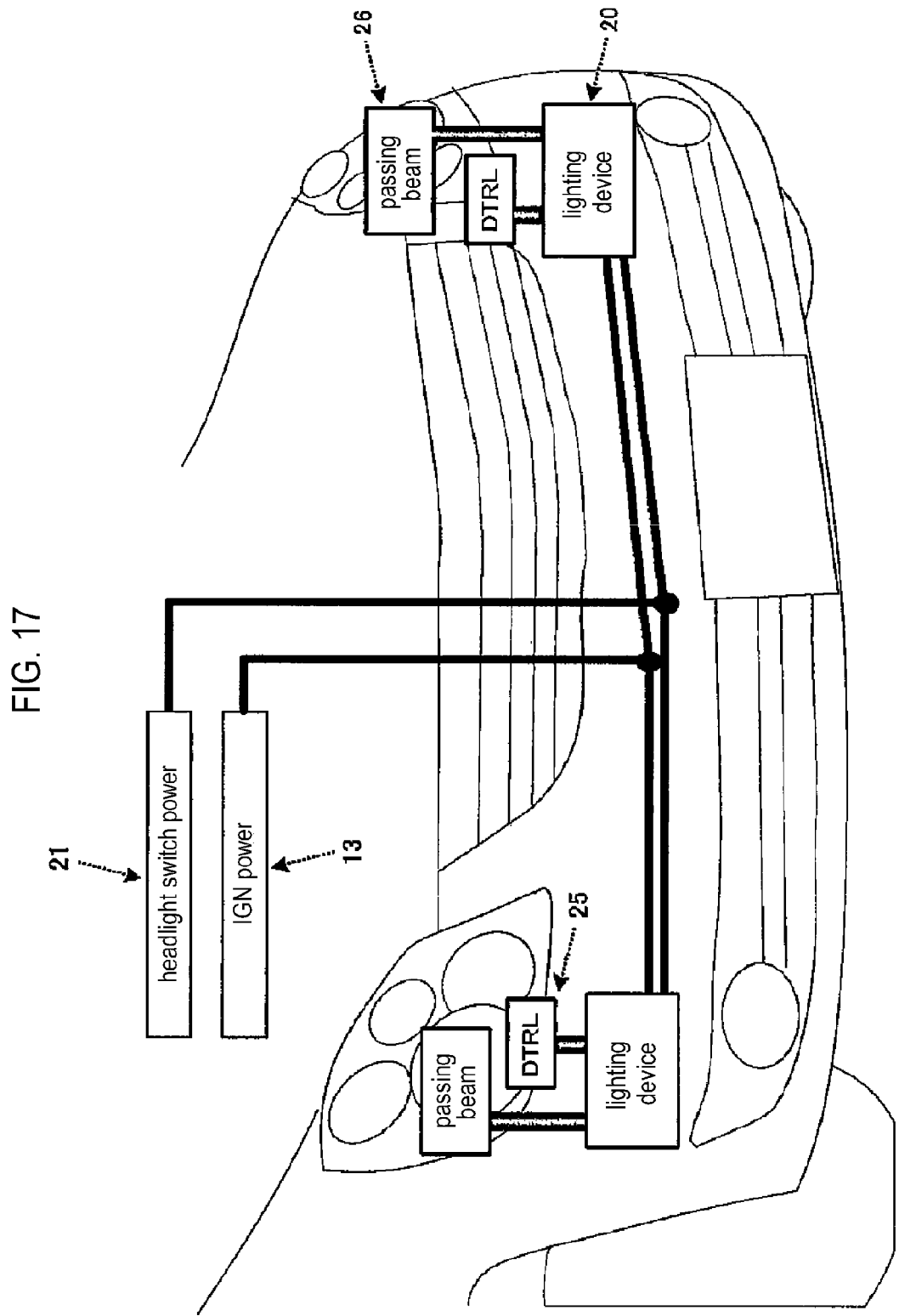
FIG. 17 is an explanatory diagram illustrating a vehicle in which a lighting device or a headlight of the present invention is mounted.
Figure 18:
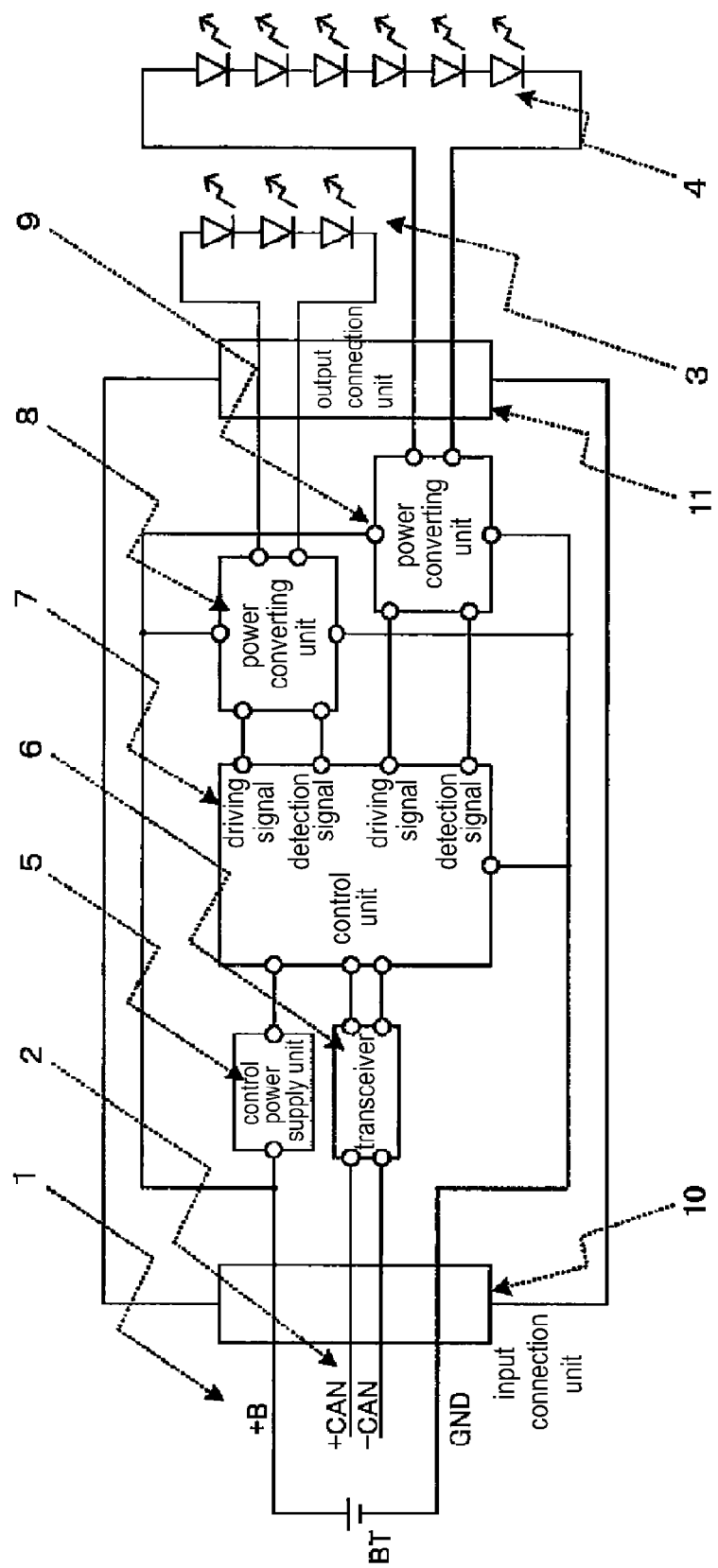
FIG. 18 is a circuit diagram of Conventional example 1.

FIG. 17 illustrates a vehicle in which a lighting device or a headlight of the present invention is mounted. A power source 21 linked with a headlight switch and an IGN power source 13 are received, and lighting of an LED 25 as a DTRL and an LED 26 as a passing beam is controlled.

By mounting the lighting device or the headlight of the present invention, the size and the cost of the vehicle can be reduced.

While certain embodiments have been described, these embodiments have been presented by way of example only, and are not intended to limit the scope of the disclosures. Indeed, the novel organic light-emitting devices described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power converter that operates a plurality of loads, the power converter comprising:

an input connection unit to receive a plurality of direct current (DC) powers, which are received in different modes and have a common ground and substantially the same potential, and to supply the plurality of DC powers to the plurality of loads;

at least a common switch element or a common coil connected to at least one of the plurality of loads; and a controller to control the respective loads according to input states of the plurality of DC powers and to supply the plurality of loads with power via the common switch element or the common coil.

2. The power converter of claim 1, wherein at least a series circuit of the common coil and the common switch element that configure a DC/DC converter for supplying a first load of the plurality of loads with power is connected to a first DC power of the plurality of DC powers, a second load of the plurality of loads is connected between a positive terminal of a second DC power of the plurality of DC powers and a positive terminal of the first DC power, and power is supplied to the second load through the series circuit.

3. The power converter of claim 1, wherein at least a series circuit of the common coil and the common switch element that configure a DC/DC converter for supplying a first load of the plurality of loads with power is connected to a first DC power of the plurality of DC powers, a second load of the plurality of loads is connected between a positive terminal of a second DC power of the plurality of DC powers and a second side of the DC/DC converter, and power is supplied to a second load through the common coil.

4. The power converter of claim 1, wherein the common coil is part of a transformer.

5. The power converter of claim 2, wherein the power supplied to the first load is greater than the power supplied to the second load.

6. The power converter of claim 2, further comprising a current limiting resistor connected with the second load between the positive terminal of the second DC power and the common ground.

7. The power converter of claim 2, wherein the second load is a light source load that blinks on and off at a frequency less than 50 Hz.

8. The power converter of claim 2, wherein the first DC power is power supplied through a switch for turning on a passing beam of a vehicle, and the second DC power is power supplied in tandem with an accessory, an ignition, or an engine ON signal of the vehicle.

9. The power converter of claim 2, wherein the first load is a vehicle headlight, and the second load is a day time running light (DTRL) of the vehicle.

10. A vehicle headlight, comprising:

the power converter of claim 1.

11. A vehicle, comprising:

the vehicle headlight of claim 10.

\* \* \* \* \*